US009488491B2

(12) United States Patent
Kato

(10) Patent No.: US 9,488,491 B2
(45) Date of Patent: Nov. 8, 2016

(54) NAVIGATION DEVICE AND NAVIGATION PROGRAM PRODUCT

(71) Applicant: DENSO CORPORATION, Kariya, Aichi-pref. (JP)

(72) Inventor: Noriko Kato, Toyoake (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/402,117

(22) PCT Filed: Jun. 26, 2013

(86) PCT No.: PCT/JP2013/003984
§ 371 (c)(1),
(2) Date: Nov. 19, 2014

(87) PCT Pub. No.: WO2014/002489
PCT Pub. Date: Jan. 3, 2014

(65) Prior Publication Data
US 2015/0134238 A1 May 14, 2015

(30) Foreign Application Priority Data

Jun. 29, 2012 (JP) .................................. 2012-147002
Jun. 29, 2012 (JP) .................................. 2012-147004
Apr. 24, 2013 (JP) .................................. 2013-091514

(51) Int. Cl.
*G01C 21/36* (2006.01)
*G01C 21/26* (2006.01)
(Continued)

(52) U.S. Cl.
CPC ............ *G01C 21/367* (2013.01); *G01C 21/26* (2013.01); *G01C 21/34* (2013.01); *G01C 21/3667* (2013.01); *G09B 29/106* (2013.01)

(58) Field of Classification Search
CPC .............. G01C 21/3484; G01C 21/34; G01C 21/3667; G01C 21/26; G01C 21/367; G09B 29/00; G09B 29/10; G09B 29/106
See application file for complete search history.

(56) References Cited

U.S. PATENT DOCUMENTS 6,049,753 A * 4/2000 Nimura .............. G01C 21/3484
701/428
6,282,492 B1 * 8/2001 Gorai ..................... G01C 21/34
701/25
(Continued)

FOREIGN PATENT DOCUMENTS

JP H06-194182 A 7/1994
JP H06-300575 A 10/1994
(Continued)

OTHER PUBLICATIONS

International Search Report of the International Searching Authority mailed Sep. 24, 2013 for the corresponding International application No. PCT/JP2013/003984 (and English translation).
(Continued)

*Primary Examiner* — Jerrah Edwards
*Assistant Examiner* — Tamara Weber
(74) *Attorney, Agent, or Firm* — Posz Law Group, PLC

(57) ABSTRACT

A navigation device includes a travel road specification portion acquiring a current location of a vehicle and specifying a travel road actually traveled by the vehicle, a continuity determination portion determining an existence of a continuity between the travel road and a first road connected to an end point of the travel road, and an extension road designation portion. The end point of the travel road is defined as a reference end point, the travel road is defined as a reference road, and the first road is defined as a determination target road. The extension road designation portion designates the first road as a first extension road when the continuity determination portion determines that the continuity exists between the first road and the travel road.

21 Claims, 15 Drawing Sheets

(51) Int. Cl.
*G09B 29/10* (2006.01)
*G01C 21/34* (2006.01)

(56) References Cited

U.S. PATENT DOCUMENTS

| | | | |
|---|---|---|---|
| 6,505,118 B2* | 1/2003 | Chowanic | G01C 21/3484 340/906 |
| 2005/0114020 A1 | 5/2005 | Seto et al. | |
| 2006/0009908 A1* | 1/2006 | Tomita | G01C 21/3492 701/411 |
| 2006/0116815 A1* | 6/2006 | Nomura | G01C 21/3415 701/417 |
| 2006/0129313 A1* | 6/2006 | Becker | G01C 21/3484 701/533 |
| 2006/0149459 A1* | 7/2006 | Matsuura | G01C 21/3679 701/540 |
| 2008/0177462 A1* | 7/2008 | Yoshioka | G01C 21/343 701/532 |
| 2009/0043488 A1* | 2/2009 | Nakayama | G01C 21/3484 701/532 |
| 2009/0138193 A1* | 5/2009 | Katou | G01C 21/3658 701/533 |
| 2009/0182496 A1 | 7/2009 | Tanabe | |
| 2010/0027527 A1* | 2/2010 | Higgins | H04W 4/18 370/351 |
| 2011/0087429 A1* | 4/2011 | Trum | G01C 21/32 701/533 |
| 2012/0078493 A1* | 3/2012 | Schunder | G01C 21/32 701/117 |
| 2015/0153193 A1* | 6/2015 | Pilloff | G01C 21/3667 701/533 |

FOREIGN PATENT DOCUMENTS

| | | |
|---|---|---|
| JP | H11-201770 A | 7/1999 |
| JP | 2003-254771 A | 9/2003 |
| JP | 2006-024194 A | 1/2006 |
| JP | 2015-164362 A | 9/2015 |
| WO | 2007/102406 A1 | 9/2007 |
| WO | 2014/002393 A1 | 1/2014 |

OTHER PUBLICATIONS

Written Opinion of the International Searching Authority mailed Sep. 24, 2013 for the corresponding International application No. PCT/JP2013/003984 (and English translation).

Office Action issued Nov. 10, 2015 in the corresponding JP application No. 2012-147002 (with English translation).

* cited by examiner

FIG. 3

| LINK ID | TRV INFO |
|---------|----------|
| L1 | 1 |
| L2 | 1 |
| L3 | 1 |
| ... | ... |
| Lm | 2 |
| ... | ... |
| Ln | 0 |

NAVIGATION DEVICE AND NAVIGATION PROGRAM PRODUCT

CROSS REFERENCE TO RELATED APPLICATIONS

This application is a U.S. national stage application of PCT/JP2013/003984 filed on Jun. 26, 2013 and is based on Japanese Patent Application No. 2012-147004 filed on Jun. 29, 2012, Japanese Patent Application No. 2012-147002 filed on Jun. 29, 2012, and Japanese Patent Application No. 2013-091514 filed on Apr. 24, 2013, the disclosures of which are incorporated herein by reference.

TECHNICAL FIELD

The present disclosure relates to a navigation device to learn a road section, a navigation device to display current location of a vehicle on a map, and a navigation program product to display current location on a map.

BACKGROUND ART

Conventionally, there are disclosed technologies to learn roads recognized by a user in order to optimize a guidance quantity for route guidance or Point of Interest (POI). For example, the technology described in Patent Literature 1 learns a road section the user actually traveled as the user-recognized road.

As another method of learning road sections, for example, the technology disclosed in Patent Literature 2 learns learning targets including not only a road the user actually traveled, but also a section unit (mesh area) including the road on the map.

However, the learning methods of the related art are unsatisfactory for the following reasons. The technology described in Patent Literature 1 learns only a traveled road section. Thus, a range of road learning becomes narrow because road sections other than the traveled road sections are not learned as the learning targets.

The technology described in Patent Literature 2 learns road sections included in the mesh area, which may include a road the user does not (or cannot) actually recognize.

The prior art indicates the widespread use of a navigation device that retrieves a route and provides guidance based on the route. Generally, such a navigation device includes a GPS receiver and displays the current location on the map.

The user may need information about an intersection in the vehicle's travel direction as well as facility information around the current location. However, the next intersection may not be displayed on the map depending on map scales.

According to the prior art, for example, Patent Literature 3 discloses the travel location display device that automatically changes map display scales and allows a single display window to display the current location and the next intersection in the vehicle's travel direction. This technology can provide a travel distance to the next intersection. Thus, the user can be free from psychological burden when he or she travels an unknown road using this kind of device.

However, in order to minimize the user's psychological burden while he or she travels an unknown road, it is insufficient to provide the information only about the next intersection.

PRIOR ART LITERATURES

Patent Literatures

Patent Literature 1: JP H11-201770 A
Patent Literature 2: JP 2003-254771 A
Patent Literature 3: JP H6-300575 A

SUMMARY OF INVENTION

In view of the foregoing difficulties, it is an object of the present disclosure to provide a navigation system capable of learning not only a road section actually traveled by a user but also a road section actually recognized by the user or highly likely to be recognized by the user. It is another object of the present disclosure to provide a navigation device and a navigation program product capable of minimizing a psychological burden of the user.

According to a first aspect of the present disclosure, a navigation device includes a travel road specification portion, a continuity determination portion, and an extension road designation portion. The travel road specification portion acquires a current location of a vehicle and specifying a travel road actually traveled by the vehicle. The continuity determination portion determines an existence of a continuity between the travel road and a first road connected to an end point of the travel road. The end point of the travel road is defined as a reference end point, the travel road is defined as a reference road, and the first road is defined as a determination target road. The extension road designation portion designates the first road as a first extension road when the continuity determination portion determines that the continuity exists between the first road and the travel road.

With above navigation device, not only a road that is actually traveled by the user by the vehicle but also a road that is highly likely to be recognized by the user can be learned.

According to a second aspect of the present disclosure, a navigation device, which performs map display to display a current location of a vehicle on a map, retrieves a route to a destination and performs a route guidance to the destination, includes a storage portion, a recognition road determination portion, a recognition road specification portion, and a switching portion. The storage portion stores a plurality of recognition roads. The recognition roads include travel roads that are actually traveled by the vehicle and extension roads that are continuous with the travel roads. The recognition road determination portion determines, based on information related to the recognition roads stored in the storage portion, whether a road corresponding to the current location of the vehicle is included in the recognition roads. The recognition road specification portion specifies a display-targeted recognition road when the recognition road determination portion determines that the road corresponding to the current location of the vehicle is not included in the recognition roads. The display-targeted recognition road is one of the recognition roads and is to be displayed on the map. The switching portion switches the map display so that the current location of the vehicle and at least a part of the display-targeted recognition road are included in one display window when the recognition road specification portion specifies the display-targeted recognition road.

With above navigation device, the road highly likely to be recognized by the user is displayed on the map together with the current location of the vehicle. Thus, the user's psychological burden can be minimized.

According to a third aspect of the present disclosure, a navigation program product, which is stored in a non-transitory tangible computer readable storage medium, includes instructions to be executed by a computer. The instructions are for implementing functions of the storage portion, the recognition road determination portion, the recognition road specification portion, and the switching portion of the navigation device according to the second aspect of the present disclosure.

With above navigation program product, the road highly likely to be recognized by the user is displayed on the map together with the current location of the vehicle. Thus, the user's psychological burden can be minimized.

According to a fourth aspect of the present disclosure, a navigation device, which performs map display to display a current location of a vehicle on a map, retrieves a route to a destination and performs a route guidance to the destination, includes a storage portion, a recognition road determination portion, and a notification portion. The storage portion stores a plurality of recognition roads. The recognition roads include travel roads that are actually traveled by the vehicle and extension roads that are continuous with the travel road. The recognition road determination portion determines, based on information related to the recognition roads stored in the storage portion, whether a road corresponding to the current location of the vehicle is included in the recognition roads. The notification portion indicates a direction toward a location where one of the travel roads is located when the vehicle approaches to one of the extension roads connected with the one of the travel roads in a case where the recognition road determination portion determines that the road corresponding to the current location of the vehicle is not included in the recognition roads stored in the storage portion.

With above navigation device, the road highly likely to be recognized by the user is displayed together with the current location. Thus, the user's psychological burden can be minimized.

According to a fifth aspect of the present disclosure, a navigation program, which is stored in a non-transitory tangible computer readable storage medium, includes instructions to be executed by a computer. The instructions are for implementing functions of the storage portion, the recognition road determination portion, and the notification portion of the navigation device according to the fourth aspect of the present disclosure.

With above navigation program product, the road highly likely to be recognized by the user is displayed together with the current location. Thus, the user's psychological burden can be minimized.

BRIEF DESCRIPTION OF DRAWINGS

The above and other objects, features and advantages of the present disclosure will become more apparent from the following detailed description made with reference to the accompanying drawings. In the drawings:

FIG. 3 is an explanatory diagram illustrating travel history information;

EMBODIMENTS FOR CARRYING OUT INVENTION

Embodiments of the present disclosure will be described with reference to the accompanying drawings.

First Embodiment

Figure 1:
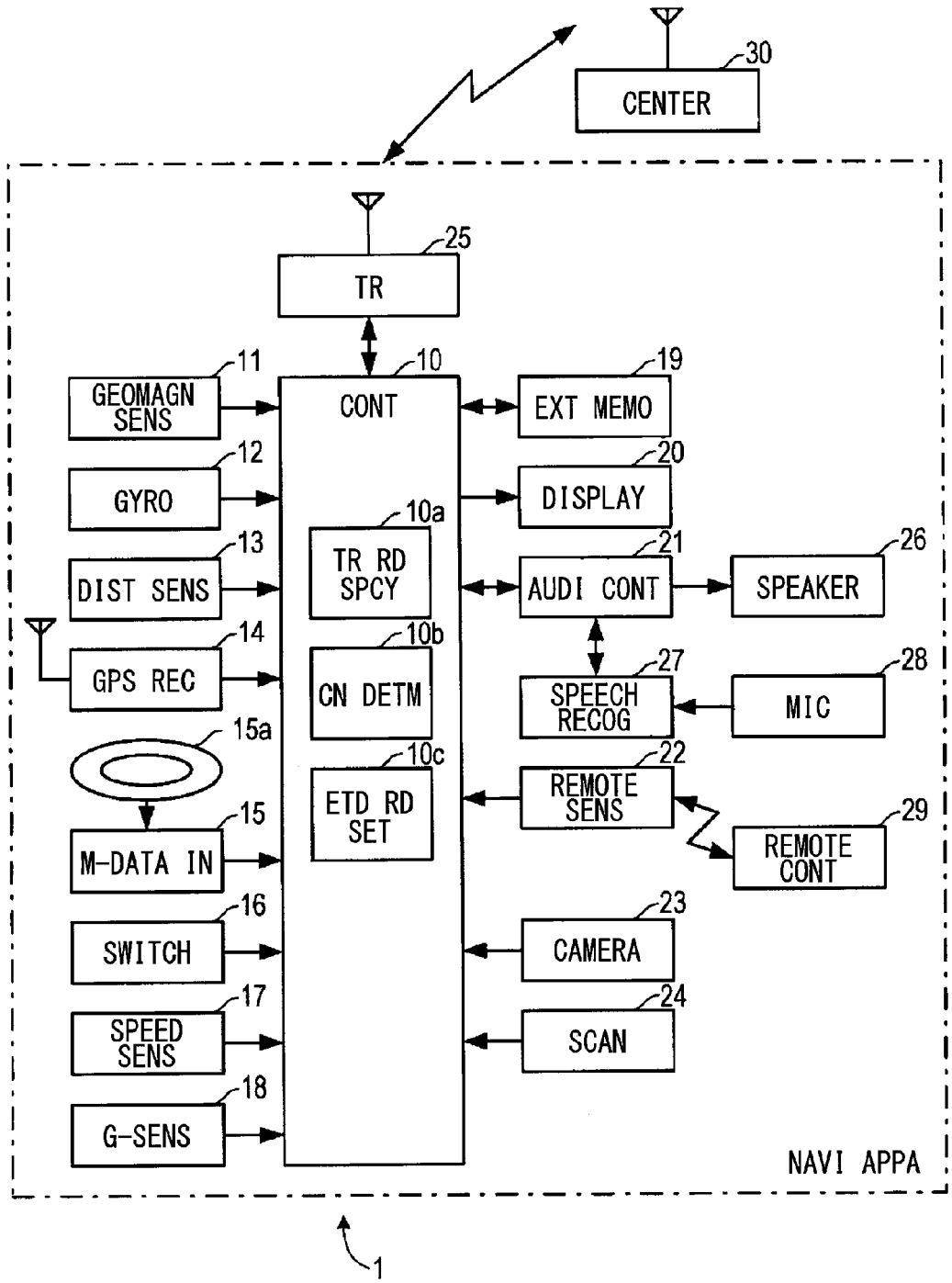
FIG. 1 is a block diagram schematically illustrating a configuration of a navigation device according to an embodiment of the present disclosure.

A navigation device (NAVI APPA) 1 as illustrated in FIG. 1 is mounted on a vehicle and includes a controller (CONT) 10 as a major component. The controller 10 is configured as a computer system and includes a central processing unit (CPU), read only memory (ROM), random access memory (RAM), an input/output interface (I/O), and a bus line connecting these components.

The controller 10 is connected with a geomagnetism sensor (GEOMAGN SENS) 11, a gyroscope (GYRO) 12, a distance sensor (DIST SENS) 13, a GPS receiver (GPS REC) 14, a map data input portion (M-DATA IN) 15, a manipulation switch group (SWITCH) 16, a speed sensor (SPEED SENS) 17, a G sensor (G-SENS) 18, external memory (EXT MEMO) 19, a display device (DISPLAY) 20, an audio controller (AUDI CONT) 21, a remote control sensor (REMOTE SENS) 22, a camera (CAMERA) 23, and a scanner (SCAN) 24.

The geomagnetism sensor 11 detects the vehicle orientation based on geomagnetism. The gyroscope 12 outputs a detection signal corresponding to an angular velocity of rotary movement applied to the vehicle. The distance sensor 13 outputs the vehicle travel distance. The GPS receiver 14 receives a signal transmitted from an artificial satellite for the global positioning system (GPS) and detects the vehicle's position coordinates and altitude. According to the above-mentioned configuration, the controller 10 is capable of calculating the vehicle's current location, orientation, and speed. A point positioning technique or a relative positioning technique may be used to calculate the current location based on an output signal from the GPS receiver 14.

The map data input portion 15 inputs map data to the controller 10. The map data is stored in DVD-ROM 15a and is input to the controller 10 via the map data input portion 15. An HDD or a CD-ROM may be used other than the DVD-ROM 15a. The map data includes road data, drawing data, map matching data, and route guidance data.

The manipulation switch group 16 allows a user to enter various instructions and is embodied as a physical push button switch. The manipulation switch group 16 may be embodied as a touch panel integrated with a display device 20.

The speed sensor 17 detects a vehicle speed. The G sensor 18 detects the vehicle acceleration. The external memory 19 is embodied as an HDD, for example. According to the present embodiment, the external memory 19 stores the travel history.

The display device 20 displays the map and various types of information. Specifically, the display device 20 uses a liquid crystal display device. The display device 20 displays map images, guidance routes, the current vehicle location, and other guidance information.

The audio controller 21 controls audio and is connected with a speaker (SPEAKER) 26 to generate the audio guidance. The audio controller 21 as well as the display device 20 provides the user with information. The audio controller 21 is also connected with a speech recognition device (SPEECH RECOG) 27, and receives, from the speech recognition device 27, a speech signal, which is input through a microphone (MIC) 28 and is recognized by the speech recognition device 27. The user can thereby input various instructions as audio instructions.

The remote control sensor 22 receives a signal from a remote control terminal (REMOTE CONT) 29 and transmits the signal to the controller 10. The user can thereby remotely input various instructions.

The camera 23 includes a CCD camera and acquires images around the vehicle. The scanner 24 scans around the vehicle. A transceiver (TR) 25 performs data communication with an external center (CENTER) 30.

As described above, the external memory 19 stores the travel history. The following describes the travel history storing process based on the flowchart in FIG. 2. The controller 10 repeatedly performs the travel history storing process while the vehicle is traveling. As illustrated in FIG. 1, the controller 10 includes a travel road specification portion (TR RD SPCY) 10a, a continuity determination portion (CN DETM) 10b, and an extension road designation portion (ETD RD SET) 10c. According to the present embodiment, a road signifies a unit road on a link basis and is associated with a link.

At S100, the controller 10 acquires the current vehicle location. Specifically, the controller 10 acquires the current vehicle location using the geomagnetism sensor 11, the gyroscope 12, the distance sensor 13, and the GPS receiver 14 as illustrated in FIG. 1, for example.

At S110, the controller 10 specifies a link corresponding to the current location. This process specifies a link ID corresponding to the current location acquired at S100. Hereinafter, acquiring or specifying a link signifies acquiring or specifying the link ID. The same applies to the following description. The process at S110 performed by the controller 10 functions as the travel road specification portion 10a.

At S120, the controller 10 determines whether the travel history is available. Specifically, the controller 10 determines availability of the travel history based on the travel history information stored in the external memory 19. The travel history information is stored as "1" indicating that the link has been traveled by the vehicle. If the travel history information is stored as "1," the controller 10 determines at S120 that the travel history is available. If the travel history is determined to be available (S120: YES), the controller 10 skips the subsequent process and terminates the travel history storing process. If the travel history is determined to be unavailable (S120: NO), the controller 10 proceeds to S130.

At S130, the controller 10 stores travel history information. Specifically, the controller 10 sets the travel history information corresponding to the link acquired at S110 as "1", and stores the travel history information.

At S140, the controller 10 stores the link. Specifically, by storing the link whose travel history information is newly stored as "1" at S130, the controller 10 is able to store a newly traveled link.

Figure 3:
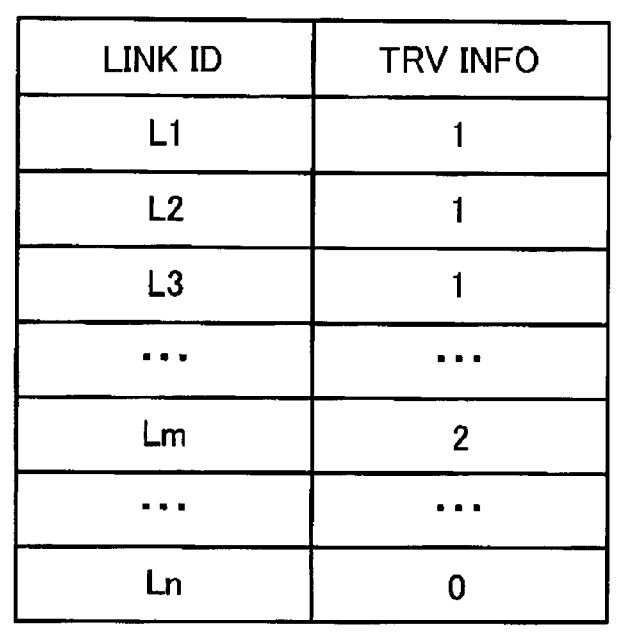

The travel history storing process stores the travel history information corresponding to links as illustrated in FIG. 3. The travel history information about links L1, L2, and L3 are stored as "1" to indicate that the links have been traveled by the vehicle. The travel history information about link Ln is stored as "0" to indicate that the link is not traveled yet. Link Lm is related to the link whose travel history information is set to "1." The travel history information about the link Lm is stored as "2" to indicate that the link is an extension road of the link that has been traveled by the vehicle.

The extension road designation process will be described according to the flowchart in FIG. 4. The controller 10 performs the extension road designation process in response to a turning on of an ignition (IG) switch. Obviously, a timing to perform the extension road designation process is not limited thereto.

At S200, the controller 10 acquires a link. Specifically, the controller 10 acquires one of the links stored at S140 in FIG. 2.

At S210, the controller 10 acquires a link connected to a link end point. Specifically, the controller 10 acquires one of links connected to the end point of the link acquired at S200.

At S220, the controller 10 determines whether the guidance is needed at a connection point. Specifically, the controller 10 determines whether the guidance is needed at a connection point between a reference link (travel road) and the link (first road) acquired at S210. The connection point at which the reference link is connected with the link acquired at S210 is also referred to as a reference end point. The reference link is also referred to as a reference road. The link connected with the reference link at the connection point is also referred to as a determination target road. Generally, no guidance is needed if two links are smoothly formed along a road. Thus, in this case, the controller 10 determines that the guidance is not needed at the connection point. There may be an irregular intersection that has many branches and is provided with special guidance data (Hereinafter, such an intersection is referred to as a complicate intersection). In this case, the guidance is assumed to be necessary even if links are smoothly formed along the road. Thus, in this case, the controller 10 determines that the guidance is needed at the connection point. If the guidance is determined to be necessary (S220: YES), the controller 10 proceeds to S270. If the guidance is determined to be unnecessary (S220: NO), the controller 10 proceeds to S230.

At S230, the controller 10 acquires road names. This process acquires a road name of the link acquired at S200 and a road name of the link acquired at S210.

At S240, the controller 10 determines whether the road names match with each other, that is, whether the road name of the link acquired at S200 is equal to the road name of the link acquired at S210. Concerning roads in Japan, for example, the controller 10 determines whether the road names are equal to each other based on the road type such as "national road" or "prefectural road" and the road number such as "1" or "10." If the road names are determined to be equal to each other (S240: YES), the controller 10 proceeds to S250 and designates the first road, which is the determination target road, as a first extension road. At S260, the controller 10 acquires a link (second road) connected to a link end point of the extension road and then repeats the process from S220. For example, the second road equal to the determination target road may satisfy the above-mentioned name equivalence condition. In such a case, the controller 10 designates the second road as a second extension road. The process at S250 stores travel history information of "2" for the link corresponding to the road designated as the extension road. If the road names are determined not equal to each other (S240: NO), the controller 10 proceeds to S270. When one of the roads has no road name, the controller 10 may assume that the road names are equal to each other. The process at S220 and S240 performed by the controller 10 functions as a continuity determination portion 10b. The process at S250 performed by the controller 10 functions as an extension road designation portion 10c.

At S270, the controller 10 determines whether other connection links are available. Specifically, the controller 10 determines whether other links are connected with the link acquired at S200 at the connection point. Upon determining that other connection links are available (S270: YES), the controller 10 repeats the process from S210. The controller 10 thereby acquires other links that are connected to the link acquired at S200. Upon determining that other connection links are unavailable (S270: NO), the controller 10 proceeds to S280.

At S280, the controller 10 determines whether an unprocessed link is available. Specifically, the controller 10 determines whether the links stored at S140 in FIG. 2 include an unprocessed link. When determining that the stored links include an unprocessed (S280: YES), the controller 10 repeats the process from S200. When determining that the stored links does not include an unprocessed link (S280: NO), the controller 10 terminates the extension road designation process.

The extension road designation process will be described more specifically.

Figure 5A:
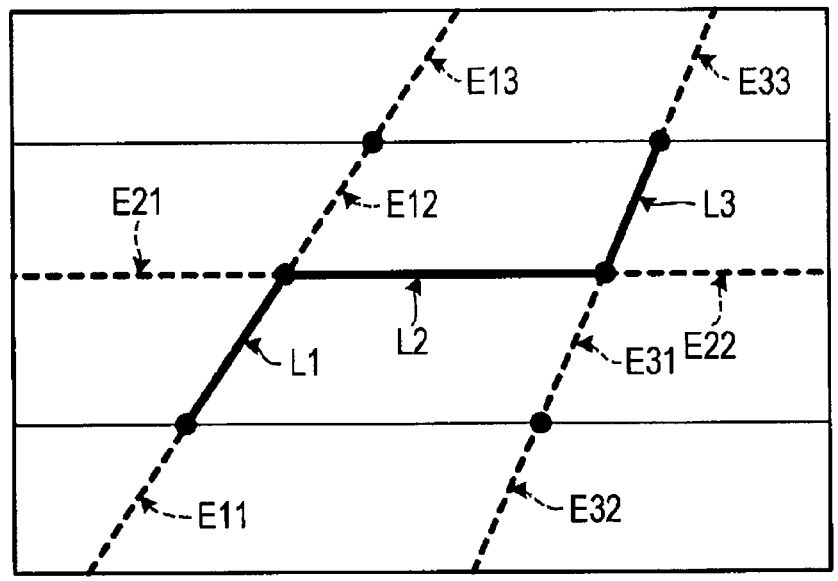
FIGS. 5A and 5B are explanatory diagrams specifically illustrating the extension road designation process according to the first embodiment.

FIG. 5A illustrates actually traveled links L1, L2, and L3 in solid lines. The controller 10 stores travel history information "1" for the links L1, L2, and L3 (S130 in FIG. 2). The controller 10 also stores the links L1, L2, and L3 as newly traveled links (S140).

Figure 4:
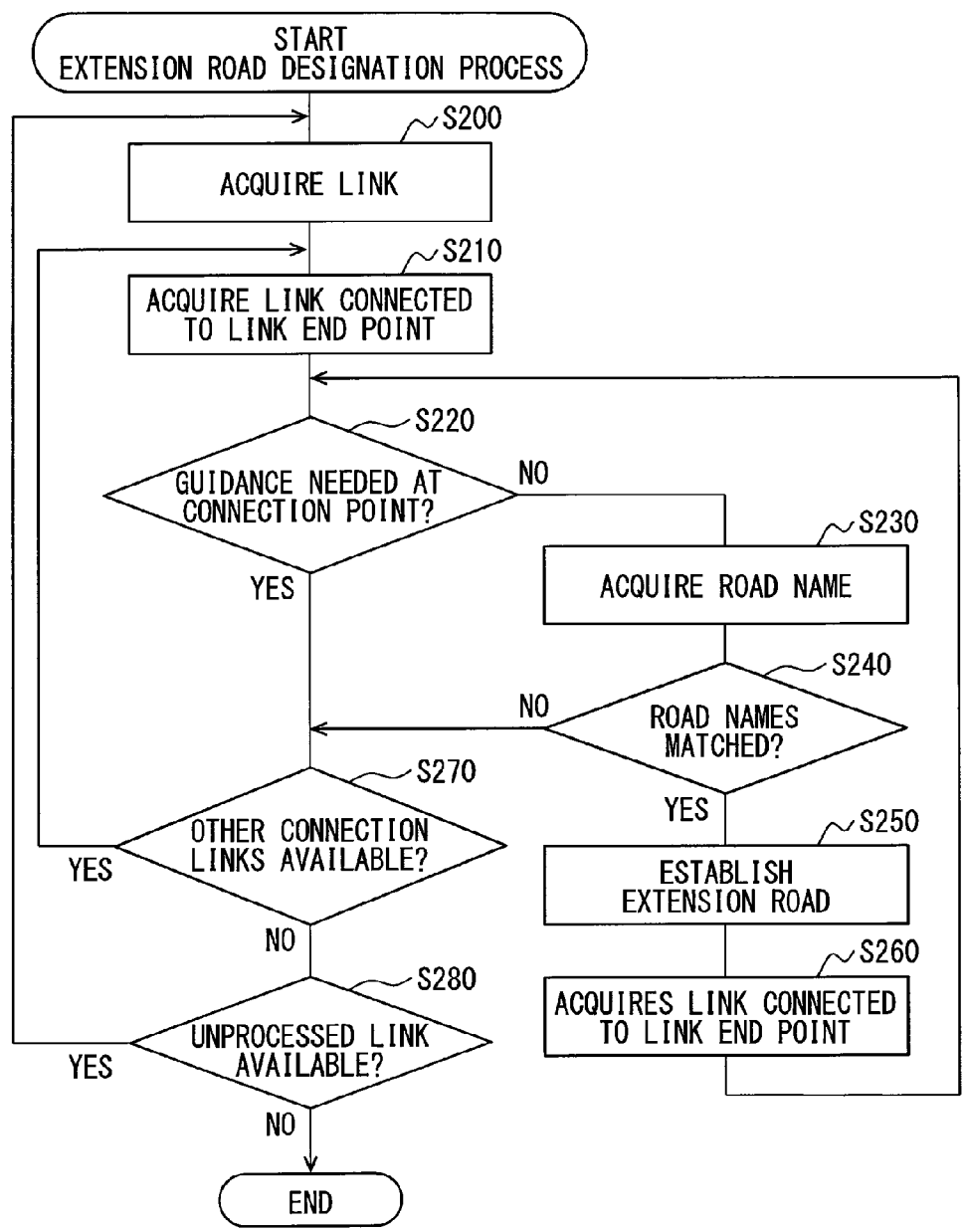
FIG. 4 is a flowchart illustrating an extension road designation process according to a first embodiment of the present disclosure.

During the extension road designation process, the controller 10 determines whether the guidance is needed at a connection point (S220 in FIG. 4). The controller 10 may determine that no guidance is needed (S220: NO) if links are smoothly formed along a road, for example. In this case, the controller 10 acquires the road name (S230). If the road names of the traveling link and the acquired link are equal to each other (S240: YES), the controller 10 designates the acquired road as an extension road (S250). The controller 10 similarly processes a link connected to the extension road (S260). Thus, in FIG. 5A, the controller 10 designates the links connected to the link L1 as the extension roads E11, E12, E13, as shown by the broken lines in FIG. 5A under the condition that the roads are along the link L1 and the road names of the links are equal to each other. The controller 10 designates extension roads E21, E22 under the condition that the roads are smoothly formed along the link L2 and the road names of the links are equal to the road name of the link L2. The controller 10 designates extension roads E31, E32, E33 under the condition that the roads are smoothly formed along the link L3 and the road names of the links are equal to the road name of the link L3.

Figure 5B:
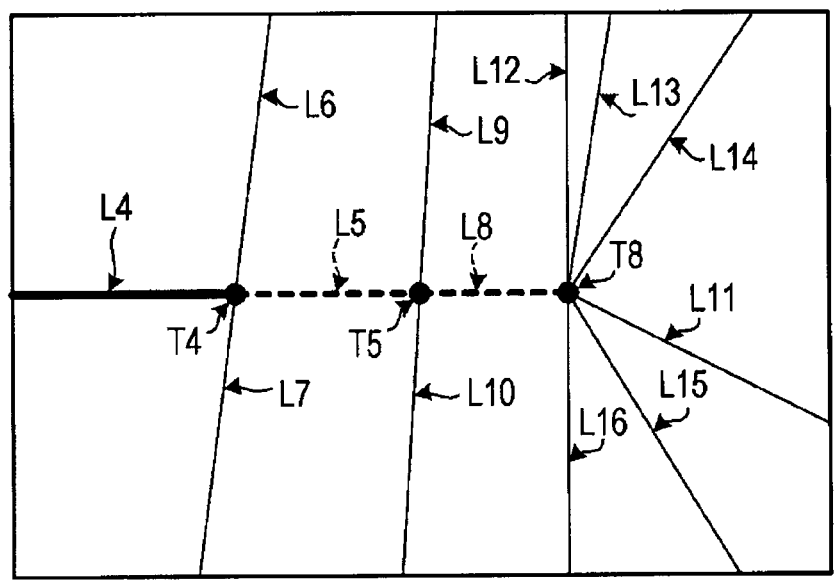

Specifically, as illustrated in FIG. 5B, the controller 10 acquires link L4 having the travel history (S200 in FIG. 4) and then acquires one of links L5, L6, and L7 connected to link end point T4 (S210). The acquired link L6 or L7 is not smoothly formed along the road. Thus, the controller 10 determines that the guidance is needed (S220: YES). The controller 10 acquires another new link. When Link L5, which is smoothly formed along the road, is acquired, the controller 10 determines that no guidance is needed (S220: NO). The controller 10 acquires a road name of link L5 (S230). If the road name of link L5 is equal to the road name of link L4 (S240: YES), the controller 10 designates link L5 as an extension road (S250). In FIG. 5B, the extension road L5 is represented by the broken line. In this case, the controller 10 further acquires one of links L8, L9, and L10 connected to end point T5 of link L5, which is designated as the extension road (S260). Then, the controller 10 performs similar process to acquired links L8, L9, L10.

When link L8 is designated as an extension road, the controller 10 acquires one of links L11, L12, L13, L14, L15, and L16 connected to end point T8 of link L8 (S260). The controller 10 finishes designating an extension road regarding link L4 when determining that the guidance is needed for any of links L11 through L16 (S220: YES) or determining that the road name of link L8 is not equal to the road name of any of links L11 through L16 (S240: NO) even if no guidance is needed at S220.

A complicate intersection having special guidance data may be assumed to require the guidance even if links are smoothly formed along a road. As illustrated in FIG. 5B, link L11 is connected to L8 along the road. End point T8 is connected with many links (L11 through L16). In this case, it is difficult to determine which link is smoothly formed with the link L8 along the road. Thus, the Special guidance data is provided at end point T8 to handle a determination of the link that is smoothly formed with the link L8 along the road.

The following describes optimization of a guidance quantity after an extension road is designated.

Figure 6:
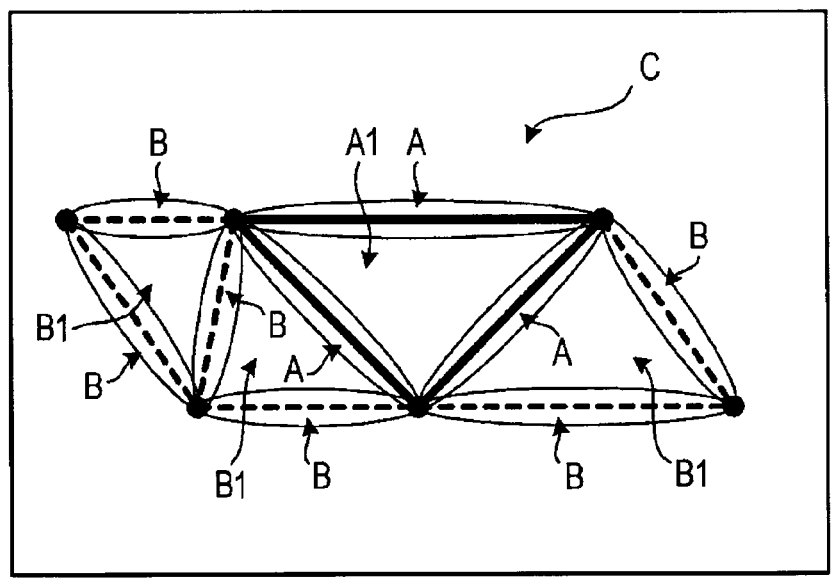
FIG. 6 is an explanatory diagram illustrating area sections to optimize a guidance quantity.

As illustrated in FIG. 6, for example, in order to reduce the guidance quantity, the ordinary guidance may be omitted for the actually traveled links (represented by the solid lines) and the ordinary guidance may be simplified for the extension road links (represented by the broken lines). Specifically, suppose that ordinary audio guidance is provided as "500 meters ahead, turn intersection XX to the right toward YY." An extension road link may be provided with the audio guidance as "500 meters ahead, turn to the right" to reduce the guidance quantity. Similar process may be performed to the actually traveled link and the extension road link. For either the traveled link or the extension link, the guidance may be not performed or the guidance quantity may be reduced. With this configuration, redundancy of performing the ordinary guidance to the link that is already identified or is highly likely to be identified by the user can be reduced.

A more appropriate retrieval algorithm may be designed according to the travel history information including extension roads, for example.

As illustrated in FIG. 6, an area along the actually traveled link (represented by the solid line) is defined as area A. An area along the extension road link (represented by the broken link) is defined as area B. A closed area surrounded by the areas A is defined as area A1. A closed area surrounded by areas B or by areas B and A is defined as area B1. The other areas are defined as areas C.

Areas A, A1, B, B1, and C may respectively use different retrieval algorithms including narrowing and sort conditions. These areas may be respectively provided with different information.

When retrieving a restaurant, for example, a user is highly likely to already recognize most of the restaurants in area A. In such a case, information may be provided by attaching special importance to new restaurants or limited time offer of the restaurants. For example, the restaurant information retrieval may provide information about newly opened restaurants, renewed restaurants, today's or seasonal special menus or discount coupons of the restaurants have been visited.

The user is less likely to recognize areas A1 and B than area A. Compared to area C, however, the user is more familiar with and more easily accessible to areas A1 and B. Thus, the areas A1 and B may be upgraded to area A. In such a case, information may be provided by attaching special importance to repeatability. For example, the restaurant information retrieval may provide information about restaurants that suite the user's taste and highly likely to become to new favorites of the user, or information about popular menus of respective restaurants.

The user is least likely to recognize most of the restaurants in areas B1 and C. These areas are less expected to ensure repeatability than area A1 or B. In such a case, restaurant information may be provided by attaching special importance to rarity or extraordinary experiences at travel destinations. For example, the restaurant information retrieval may provide information about local specialty, famous or popular restaurants rather than the user's taste. In consideration of travel destinations, retrieval targets may include restaurants whose service and menu pricing is slightly higher than ordinary pricing, for example. Contrary to providing rarity information, ordinary information may be provided by attaching special importance to ordinariness in consideration of relieving from uneasiness in an unknown area. For example, the retrieval may provide information about affiliates of a frequently visited restaurant.

The following describes advantages provided by the navigation device 1 according to the present embodiment.

In the present embodiment, the controller 10 includes the travel road specification portion 10a, the continuity determination portion 10b, and the extension road designation portion 10c.

The travel road specification portion 10a acquires the current vehicle location (S100 in FIG. 2) to specify a travel road actually traveled by the vehicle (S110). The continuity determination portion 10b determines whether continuity is retained in a road connected to an end point of the travel road that is specified by the travel road specification portion 10a (S220 and S240 in FIG. 4). When the continuity determination portion 10b determines that the road to be continuous, the extension road designation portion 10c designates the road as an extension road (S250).

The navigation device 1 according to the present embodiment establishes the extension road by determining whether the extension road is continuous with the actually traveled travel road. The navigation device 1 can thereby learn not only a road section the user actually traveled but also a road section that the user recognizes or is highly likely to recognize.

In the present embodiment, the controller 10 establishes a first extension road (S250 in FIG. 4), acquires a link connected to the link end point of the first extension road (S260), determines the presence or absence of continuity (S220 and S240), and establishes another extension road (second extension road) (S250). Namely, the continuity determination portion 10b determines the presence or absence of continuity of a road connected to the end point of the extension road. Herein, the end point of the extension road is disposed opposite to the travel road. When the continuity determination portion 10b determines that the road is continuous, the extension road designation portion 10c designates the road as another extension road. The controller 10 can thereby designate a road connected to the extension road as another extension road. Thus, a road section the highly likely to be recognized by the user can be learned by the navigation device 1. The process at S260 may limit the number of times to acquire a link connected to the link end point of the extension road. The controller 10 may acquire a link connected to the link end point once or more. The number of times to acquire a link connected to the link end point may be set according to road type, road width, and the number of lanes included in the travel road (or extension road). For example, the number of times to acquire a link connected to the link end point may be increased as the road width or the number of lanes increases.

The presence or absence of continuity is determined depending on whether the guidance is needed at the connection point between the reference road as the reference link and the determination target road connected to the reference link (S220 in FIG. 4). The continuity is determined to be existent if no guidance is needed (S220: NO). The continuity determination portion 10b determines the continuity to be existent if the end point requires no guidance. The navigation device 1 basically determines a road along the road to be an extension road. Thus, the navigation device 1 can properly establish an extension road.

The presence or absence of continuity is also determined depending on an equivalence of the road name (S240 in FIG. 4). The continuity is determined to be existent if the road name of the reference link is equal to the road name of the determination target link (S240: YES). The continuity determination portion 10b determines the continuity to be existent if both roads connected at the end point have names that are partially the same with one another. Since the navigation device 1 determines a road having the same road name as an extension road, the navigation device 1 can properly establish an extension road.

In the present embodiment, the travel history information (TRV INFO) is stored as "1" to represent an actually traveled link, or is stored as "2" to represent an extension road link (see FIG. 3). With this configuration, the extension road designation portion 10c establishes the extension road and the travel road in a distinguishable manner. This enables a change of the guidance quantity corresponding to the travel road or the extension road.

According to the first embodiment, the controller 10 determines that the continuity exists if no guidance is needed at S220 in FIG. 4 (S220: NO). When the road manes are equal to each other, the controller 10 designates the road determined to have the continuity as the extension road (S240: YES). Alternatively, the process at S220 may be omitted and replaced by S230 and S240. In this case, if the road names are equal to each other, the controller 10 may proceed to S250 to establish an extension road. If the road names are not equal to each other, the controller 10 may proceed to S270.

Second Embodiment

Figure 7:
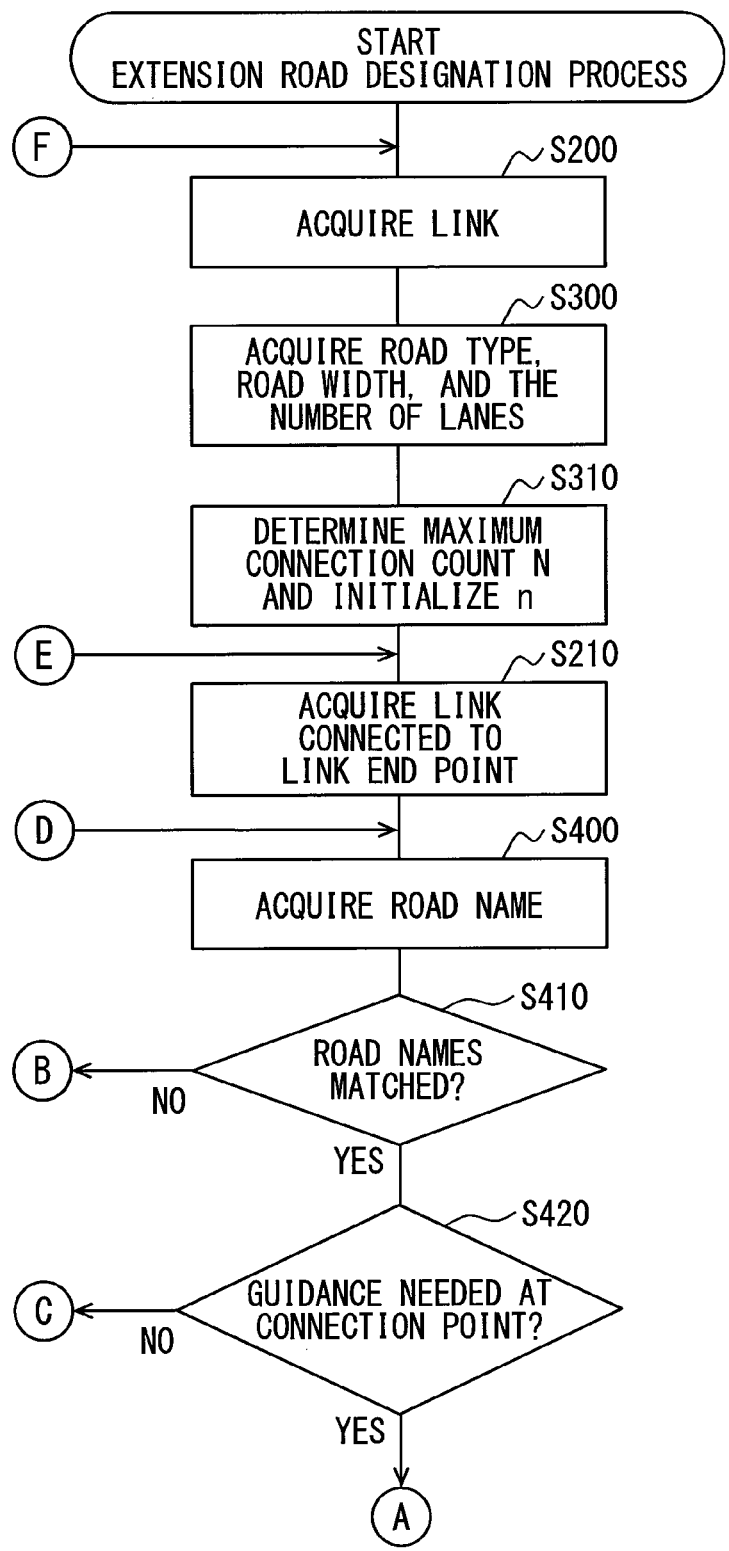
FIG. 7 is the first half of a flowchart illustrating an extension road designation process according to a second embodiment.
Figure 8:
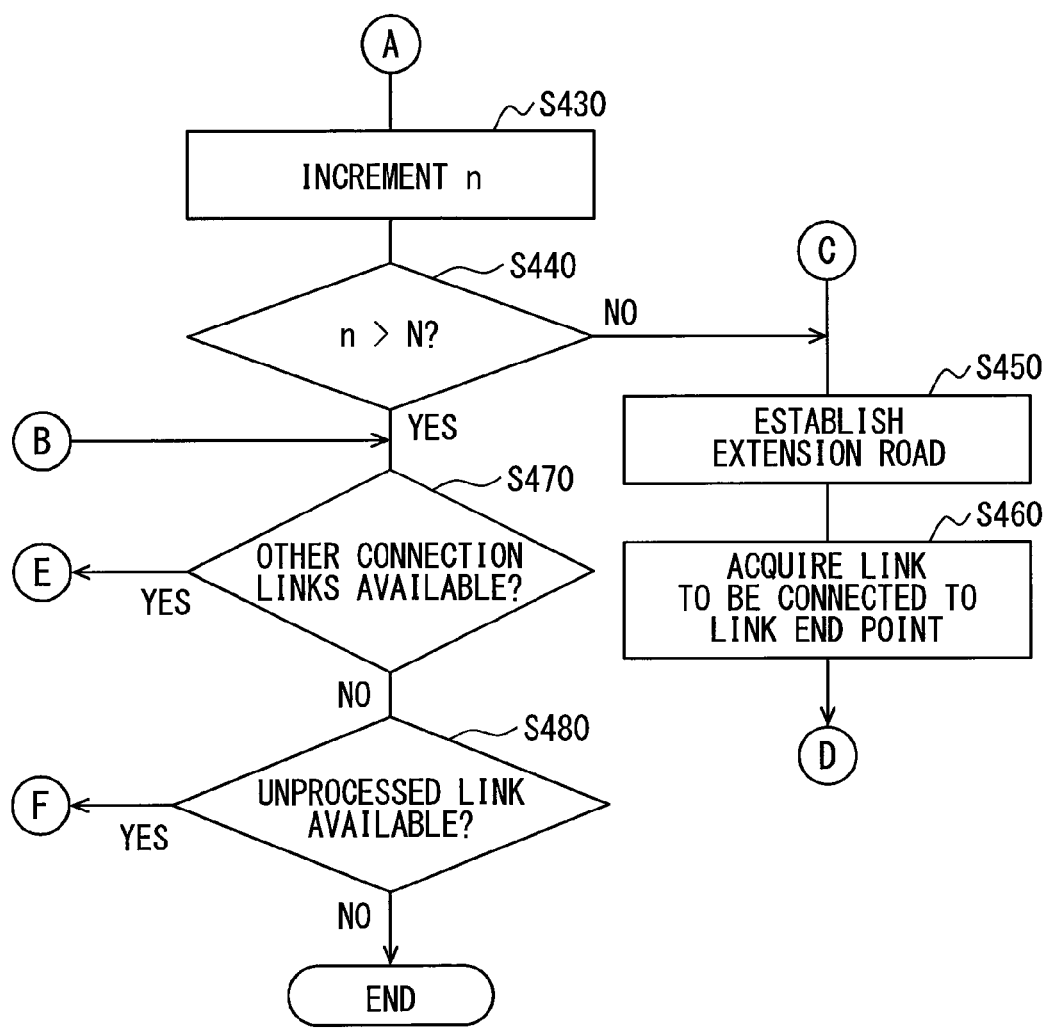
FIG. 8 is the second half of the flowchart illustrating the extension road designation process according to the second embodiment.
Figure 9:
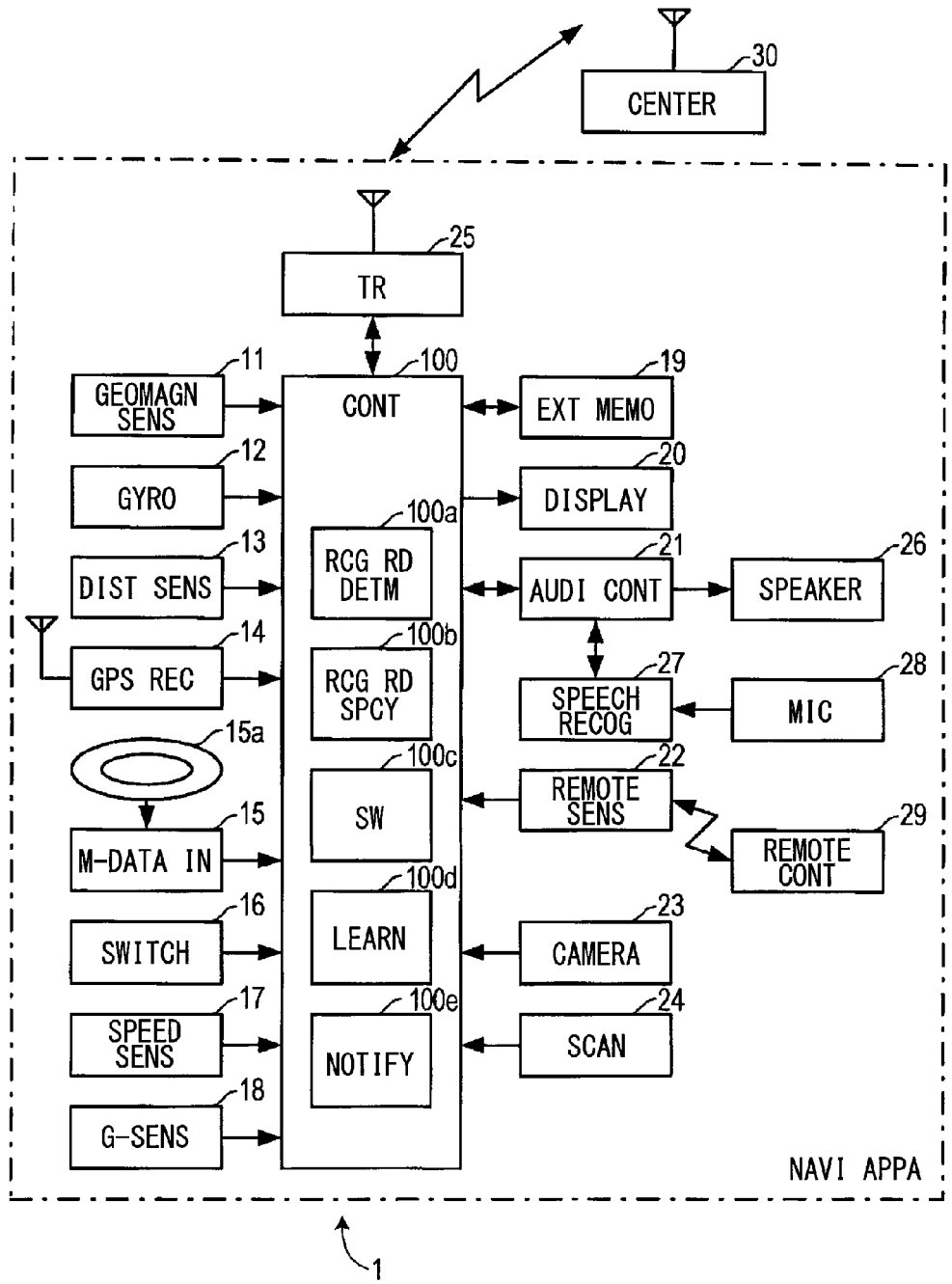
FIG. 9 is a block diagram schematically illustrating a configuration the navigation device according to a third embodiment of the present disclosure.

With reference to FIGS. 7 and 8, the following describes the navigation device 1 according to a second embodiment of the present disclosure. The second embodiment differs from the first embodiment in the extension road designation process performed by the controller 10. With reference to FIGS. 7 and 8, the following describes the extension road designation process performed by the controller 10 according to the present embodiment. Similarly to the first embodiment, the controller 10 performs the extension road designation process in response to the turning on of the IG switch. Obviously, the timing to perform the extension road designation process is not limited thereto. The following mainly describes processes added to the extension road designation process according to the first embodiment.

At S200, the controller 10 acquires a link. At S300, the controller 10 acquires road type, road width, and the number of lanes included in the road. This process acquires information about a road scale of the link acquired at S200.

At S310, the controller 10 determines maximum connection count N based on the road type, the road width, and the number of lanes acquired at S300. The controller 10 initializes a variable n to 1. The controller 10 may determine, according to the reference link, that the guidance is needed at the connection point. In this case, maximum connection count N indicates how many extension roads need to be established. In other words, maximum connection count N specifies the number of times to establish the extension roads.

At S400, the controller 10 acquires the road name. This process is similar to S230 in FIG. 4.

At S410, the controller 10 determines whether the road names are equal to each other. This process is similar to S240 in FIG. 4. Upon determining that the road names are equal to each other (S410: YES), the controller 10 proceeds to S420. Upon determining that the road name are not equal to each other (S410: NO), the controller 10 proceeds to S470 in FIG. 8. When the road name of the link connected to the connection point is unavailable, the controller 10 assumes that the road names are equal to each other.

At S420, the controller 10 determines whether the guidance is needed at the connection point. This process is similar to S220 in FIG. 4. Upon determining that the guidance is needed (S420: YES), the controller 10 proceeds to S430 in FIG. 8. Upon determining that the guidance is not needed (S420: NO), the controller 10 proceeds to S450 in FIG. 8. In the present embodiment, the process at S410 and S420 performed by the controller 10 functions as the continuity determination portion 10b.

At S430, the controller 10 increments the variable n. At S440, the controller 10 determines whether the variable n is greater than the maximum connection count N. When n>N (S440: YES), the controller 10 proceeds to S470. When n≤N (S440: NO), the controller 10 proceeds to S450.

At S450, the controller 10 establishes an extension road. At S460, the controller 10 acquires a link connected to the link end point of the extension road. The controller 10 then repeats the process from S400. The process at S450 and S460 is similar to the process at S250 and S260 in FIG. 4. In the present embodiment, the process at S450 functions as the extension road designation portion 10c.

At S470, similarly to S270 in FIG. 4, the controller 10 determines whether other connection links are available. Specifically, the controller 10 determines whether there are other links connected to the link acquired at S200. Upon determining that other connection links are available (S470: YES), the controller 10 repeats the process from S210 in FIG. 7. Upon determining that other connection links are unavailable (S470: NO), the controller 10 proceeds to S480.

At S480, similarly to S280 in FIG. 4, the controller 10 determines whether an unprocessed link is available. Upon determining that an unprocessed link is available (S480: YES), the controller 10 repeats the process from S200. Upon determining that an unprocessed link is unavailable (S480: NO), the controller 10 terminates the extension road designation process.

In the extension road designation process, the controller 10 may determine that the guidance is needed at the connection point when the road names are equal to each other (S410: YES and S420: YES in FIG. 7). In this case, the controller 10 designates the link connected to the reference link as an extension road (S450) under a condition that the maximum connection count N is not exceeded (S440: NO in FIG. 8). Maximum connection count N depends on the road type, the road width, and the number of lanes of the reference link (S300 and S310).

The following describes advantages provided by the navigation device 1 according to the present embodiment.

The present embodiment provides similar advantages with the above-mentioned embodiment.

According to the present embodiment in particular, the controller 10 sets the maximum connection count N (S310 in FIG. 7). The controller 10 establishes an extension road (S450) when the variable n does not exceed the maximum connection count N (S440: NO in FIG. 8). The extension road designation portion 10c establishes additional extension roads using the maximum connection count as well as the determination performed by the continuity determination portion 10b. The navigation device 1 designates a road highly likely to be recognized as an extension road even if the road does not smoothly formed along the existing road, that is the road may require a turning right or left. Thus, the navigation device 1 can properly establish an extension road.

The maximum connection count N is set based on the road type, the road width, and the number of lanes for the travel road (S300 and S310 in FIG. 7). Namely, the extension road designation portion 10c sets the maximum connection count N according to the scale of the travel road. The navigation device 1 thereby is able to appropriately determine the maximum connection count and establish an extension road within an appropriate range.

Third Embodiment

With reference to FIGS. 9, and 11 through 15B, the following describes the navigation device 1 according to a third embodiment of the present disclosure. The navigation device 1 according to the present embodiment differs from the other embodiments in changes of map display on the display device 20. The description about similar configurations is omitted for simplicity.

A controller 100 of the navigation control device 1 according to the present embodiment includes a recognition road determination portion (RCG RD DETM) 100a, a recognition road specification portion (RCG RD SPCY) 100b, a switching portion (SW) 100c, and a notification portion (NOTIFY) 100e.

According to the present embodiment, a "travel road" is actually traveled and is provided with the travel history information set to "1." An "extension road" is extended from the travel road and is provided with the travel history information set to "2." A combination of the travel road and the extension road is referred to as a "recognition road." The external memory 19 stores recognition roads that are highly likely to be recognized by the user.

Figure 11:
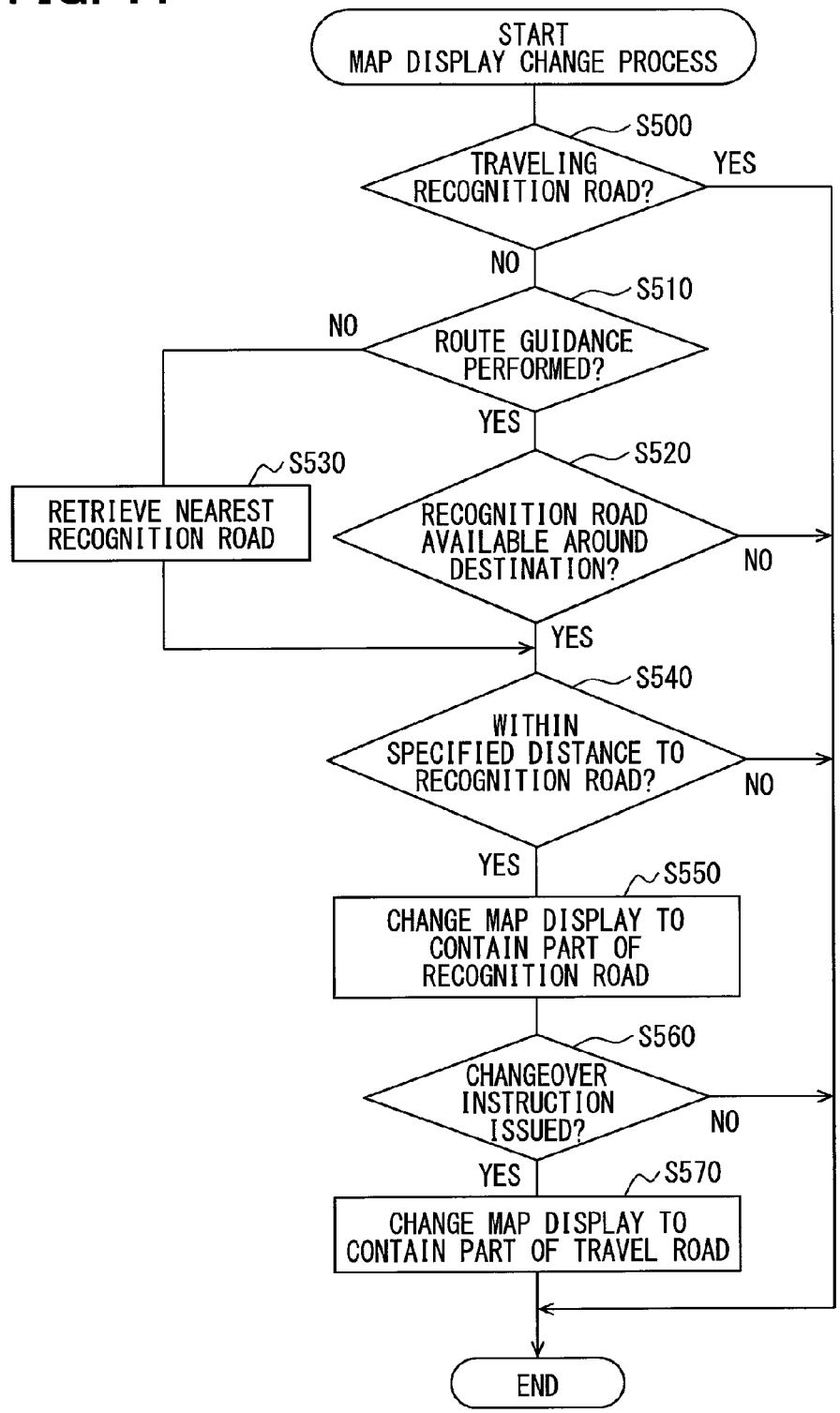
FIG. 11 is a flowchart illustrating a map display switch process according to the third embodiment.

With reference to the flowchart in FIG. 11, the following describes a map display switch process performed by the controller 100. The map display switch process is repeatedly performed when the ignition (IG) switch is in a turned-on state and the map is displayed on the display device 20 of the navigation device 1.

At S500, the controller 100 determines whether the road currently traveled by the vehicle corresponds to a recognition road highly likely to be recognized by the user. Specifically, the controller 100 determines whether the road currently traveled by the vehicle corresponds to one of the recognition roads, which include the travel roads and the extension roads and are stored in the external memory 19. The determination is affirmed also when the vehicle diverges from the travel road. Upon determining that the road currently traveled by the vehicle corresponds to the recognition road (S500: YES), the controller 100 skips the subsequent process and terminates the map display switch process. Upon determining that the road currently traveled by the vehicle does not correspond to the recognition road (S500: NO), the controller 100 proceeds to S510. The process at S500 functions as the recognition road determination portion 100a that determines whether the road currently traveled by the vehicle corresponds to the recognition road.

At S510, the controller 100 determines whether the navigation device 1 is performing the route guidance. The controller 100 affirms the determination when the navigation device 1 retrieves a route and performs the route guidance based on the retrieved guidance route. Upon determining that the navigation device 1 is performing the route guidance (S510: YES), the controller 100 proceeds to S520. Upon determining that the navigation device 1 is not performing the route guidance (S510: NO), the controller 100 proceeds to S530.

At S520, the controller 100 determines whether a recognition road exists around the destination. Specifically, the controller 100 determines whether a recognition road exists within a radius of predetermined meters (m) around the destination. Upon determining that a recognition road exists around the destination (S520: YES), the controller 100 proceeds to S540. The recognition road around the destination is also referred as a first recognition road. In this case, the recognition road around the destination (first recognition road) corresponds to a display-targeted recognition road to be displayed on the map. Upon determining that no recognition road exists around the destination (S520: NO), the controller 100 skips the subsequent process and terminates the map display switch process.

At S530, the controller 100 retrieves the nearest recognition road. Specifically, the controller 100 retrieves a recognition road most close to the current vehicle location. The nearest recognition road may be located ahead the vehicle in the traveling direction along the road. In this case, the distance to be traveled by the vehicle in the traveling direction is calculated by multiplying the actual distance by a coefficient p (0<p<1). Thus, the calculated distance to the recognition road located ahead the vehicle in the traveling direction is shorter than the actual distance. The recognition road nearest to the current vehicle location is also referred to as a second recognition road. This recognition road (second recognition road) corresponds to a display-targeted recognition road to be displayed on the map. After the process at S530, the controller 100 proceeds to S540. The process at S520 and S530 performed by the controller 100 functions as the recognition road specification portion 100b.

At S540, the controller 100 determines whether the display-targeted recognition road is located within a predetermined distance from the vehicle. Specifically, the controller 100 determines whether the distance to the display-targeted recognition road from the current location of the vehicle is within a predetermined distance L meters (m). Upon determining that the display-targeted recognition road is located within the predetermined distance (S540: YES), the controller 100 proceeds to S550. Upon determining that the display-targeted recognition road is not located within the predetermined distance (S540: NO), the controller 100 skips the subsequent process and terminates the map display switch process.

At S550, the controller 100 controls the display device 20 to change the map display, that is, to switch the map display so that the map display includes at least part of the display-targeted recognition road. Specifically, the controller 100 automatically changes the map scale to include the current location and part of the display-targeted recognition road, adjusts the vehicle's display position (display area), and displays the current location and part of the display-targeted recognition road.

At S560, the controller 100 determines whether a switchover instruction is issued. Specifically, the controller 100 determines whether the user issued a switchover instruction using the manipulation switch group 16 illustrated in FIG. 9. At S550, the map display switch process displays part of the display-targeted recognition road. In this case, the user may issue a switchover instruction to zoom out the map display. Upon determining that the user issued a switchover instruction (S560: YES), the controller 100 proceeds to S570 to display the map including at least part of the travel road and then terminates the map display switch process. Upon determining that the user does not issue a switchover instruction (S560: NO), the controller 100 skips the process at S570 and terminates the map display switch process. The process at S550 and S570 performed by the controller 100 functions as the switching portion 100c.

Figure 12A:
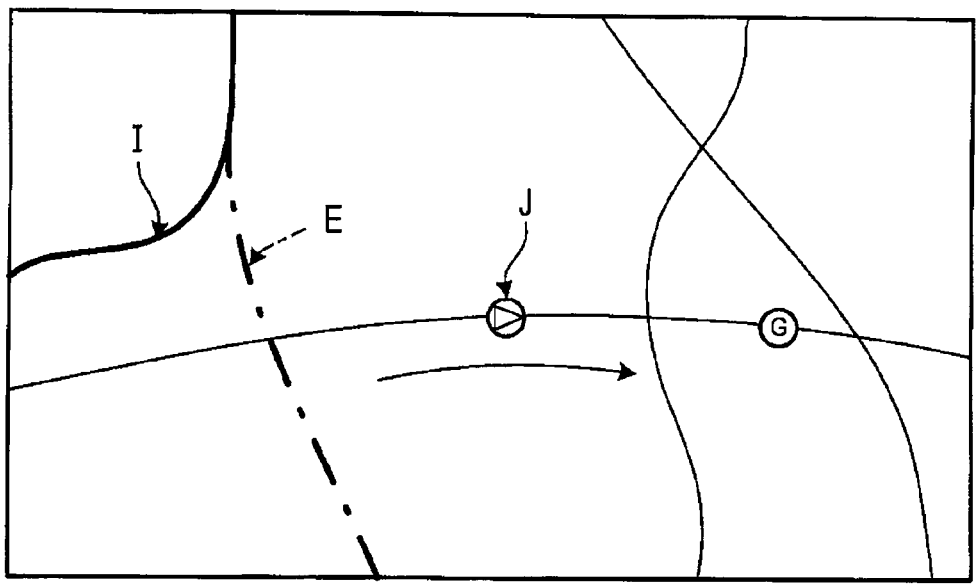
FIGS. 12A and 12B are explanatory diagrams specifically illustrating the map display switch process according to the third embodiment.
Figure 12B:
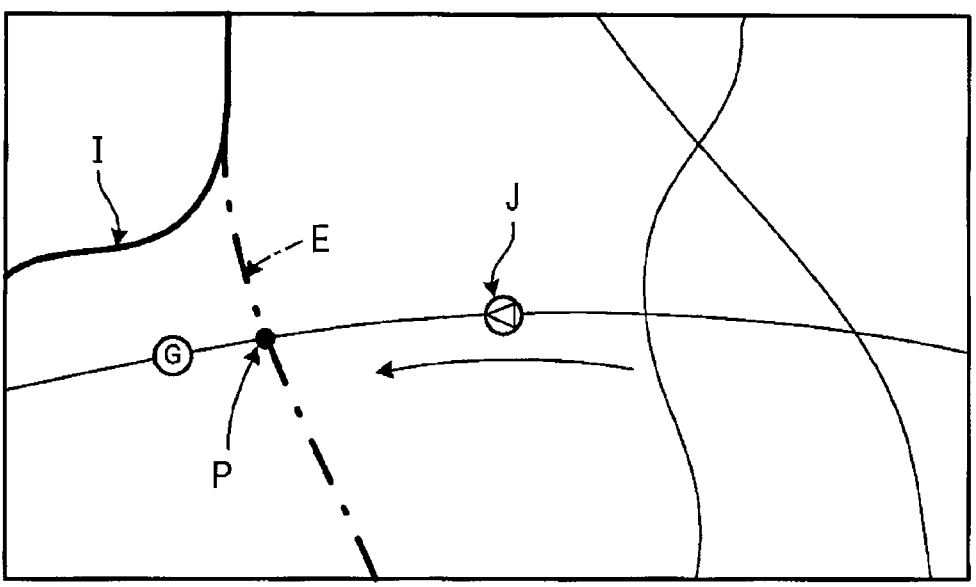

As shown in FIGS. 12A and 12B, the vehicle J travels in the direction of an arrow. Suppose that the vehicle 3 travels a road unknown to the user and the route guidance is performed up to the destination indicated by symbol G.

In FIG. 12A, travel road I and extension road E as a recognition road exist behind the vehicle in the traveling direction. No recognition road exists around destination G. Therefore, the controller 100 determines that no recognition road exists around destination G (S510: YES and S520: NO in FIG. 11). The controller 100 does not switch the map display to include part of the recognition road (S550). Namely, the controller 100 does not switch the map display when no recognition road exists around the destination even if a recognition road exists near the start location or the vehicle diverges from the recognition road, for example.

In FIG. 12B, travel road I and extension road E as a recognition road exist ahead the vehicle in the traveling direction. A recognition road exists around destination G. Therefore, the controller 100 determines that a recognition road exists around destination G (S510: YES and S520: YES in FIG. 11). When the vehicle enters a range within a specified predetermined distance to point P on extension road E (S540: YES), the controller 100 switches the map display to include part of the recognition road (S550). That is, if a recognition road exists around the destination, the controller 100 switches the map display and displays a road highly likely to be recognized by the user together with the current location.

Figure 13A:
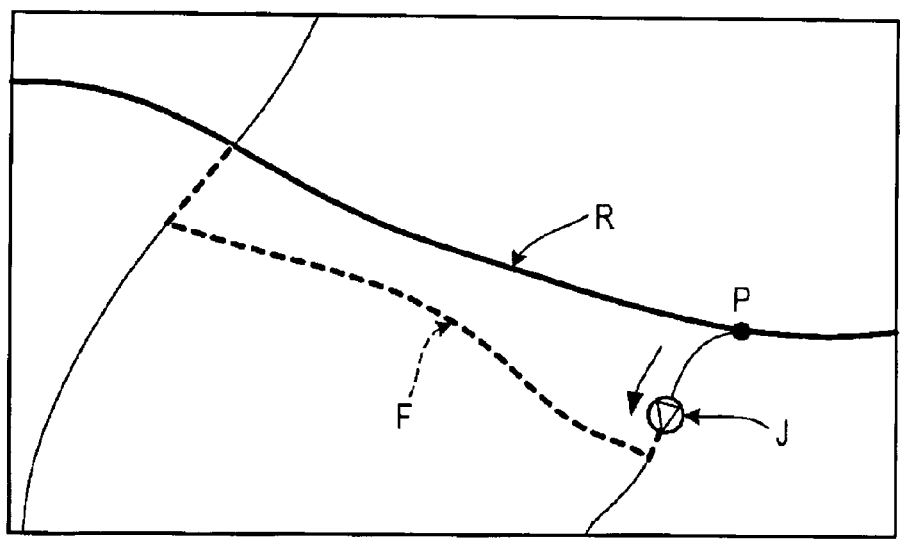
FIGS. 13A and 13B are explanatory diagrams specifically illustrating the map display switch process according to the third embodiment.
Figure 13B:
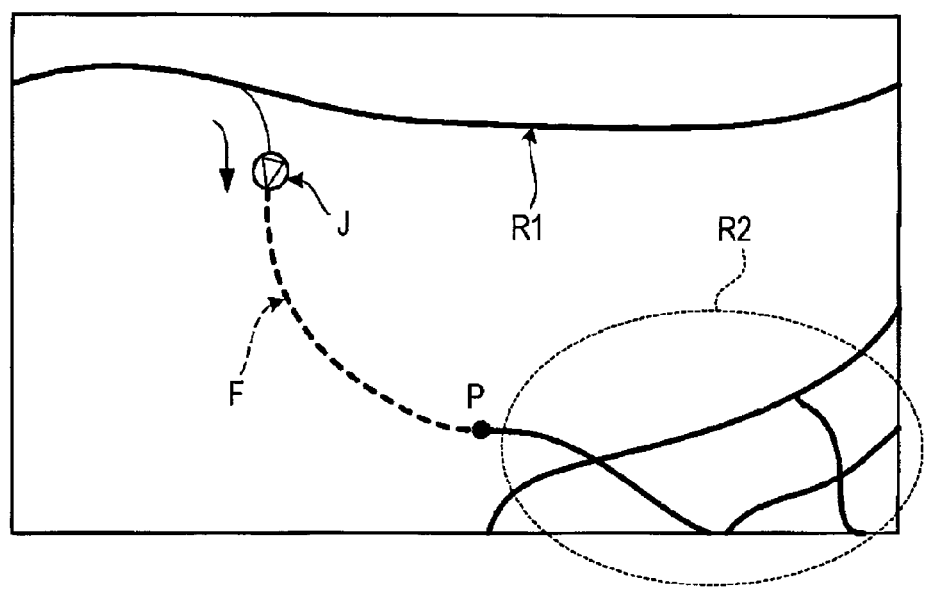

FIGS. 13A and 13B illustrate that vehicle 3 diverges from recognition roads R and R1. Suppose that no route guidance is performed in this case.

In FIG. 13A, the controller 100 may determine that the vehicle diverges from recognition road R (S500: NO and S510: NO in FIG. 11). In this case, the controller 100 then retrieves nearest recognition road R (S530). Specifically, the determination is based on a distance from the vehicle to point P where the vehicle diverged from the recognition road. Upon determining that recognition road R exists within a predetermined distance (S540: YES), the controller 100 switches the map display to include at least part of recognition road R (S550). In this case, the controller 100 displays part of recognition road R and guidance road F that guides a route from the current location of the vehicle to recognition road R (S550). In other words, if the vehicle diverges from the road highly likely to be recognized, the controller 100 displays the road highly likely to be recognized and a guidance road to return to the road highly likely to be recognized.

In FIG. 13B, the controller 100 may determine that the vehicle diverges from recognition road R1 (S500: NO and S510: NO in FIG. 11) and then retrieves nearest recognition road R2 (S530). Recognition road R2 includes several sub recognition roads. As described above, the distance to be traveled by the vehicle 3 in the traveling direction is calculated by multiplying the actual distance by the coefficient p ($0<p<1$). Thus, the calculated distance to recognition road R2 located in the traveling direction from vehicle 3 is shorter than the actual distance. Specifically, the controller 100 multiplies distance to point P along the road shape by the coefficient p to calculate the distance. Upon determining that recognition road R2 is located within a predetermined distance (S540: YES), the controller 100 switches the map display to include at least part of recognition road R2 (S550). In this case, the controller 100 displays part of recognition road R2 and guidance road F from the current location to recognition road R2 (S550). That is, if the vehicle diverges from the road highly likely to be recognized, there may be another road highly likely to be recognized in the traveling direction. In such a case, the controller 100 displays another road highly likely to be recognized and a guidance road leading to the another road highly likely to be recognized.

As described above, the controller 100 switches the map display to include at least part of the recognition road at S550. At the same time, the controller 100 displays the guidance road to the recognition road.

In this case, the controller 100 controls the display device 20 to display the display-targeted recognition road and the guidance road on the map so that the user can recognize these roads. For example, these roads may be displayed in colors different from those for the other roads. The display-targeted recognition road and the guidance road may be highlighted (reversed) or may blink. The display-targeted recognition road and the guidance road may be displayed so as to be distinguishable from each other. Concerning the display-targeted recognition road, the travel road and the extension road may be displayed so as to be distinguishable from each other.

As described above, the controller 100 switches the map display to include at least part of the travel road at S570 when the user issues a switchover instruction to switch the map display (S560).

In this case, the map scale switchover based on the user's switchover instruction differs from the ordinary map scale switchover. The scale is switched so as to include at least part of the travel road. The scale is switched at an irregular interval. Suppose that the ordinary map scale changes at a fixed interval in ascending order of 100 m, 200 m, 400 m, 800 m, and 1.6 kilometers (km), for example. At S570, the controller 100 changes the scale from 400 m to 1.6 km. The scale is changed at an irregular interval according to the positional relationship between the current location and the travel road. At S550, the map display switches automatically. Also in this case, the scale is changed at an irregular interval according to the positional relationship between the current location and the display-targeted recognition road.

Figure 14:
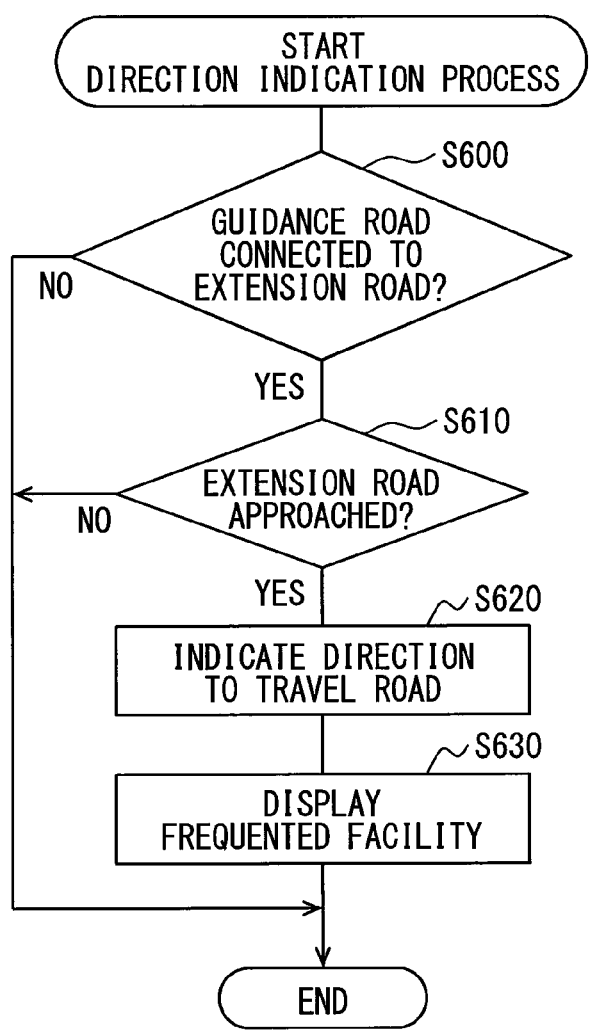
FIG. 14 is a flowchart illustrating a direction indication process according to the third embodiment.

With reference to a flowchart in FIG. 14, the following describes a direction indication process performed by the controller 100. If no route guidance is performed, the controller 100 performs the direction indication process after the map display switch process in FIG. 11.

At S600, the controller 100 determines whether the guidance road is connected to an extension road. Specifically, a display-targeted recognition road includes a travel road and an extension road. The controller 100 determines whether the guidance road is connected to an extension road, which is included in the display-targeted recognition road. Upon determining that the guidance road is connected to an extension road (S600: YES), the controller 100 proceeds to S610. Upon determining that the guidance road is not connected to an extension road (S600: NO), the controller 100 skips the subsequent process and terminates the direction indication process.

At S610, the controller 100 determines whether the vehicle approaches to the extension road. To do this, for example, the controller 100 determines whether the distance from the vehicle to an intersection between the guidance road and the extension road is shorter than a predetermined threshold value such as 50 m. Upon determining that the vehicle approaches to the extension road (S610: YES), the controller 100 proceeds to S620. Upon determining that the vehicle does not approach to the extension road (S610: NO), the controller 100 skips the subsequent process and terminates the direction indication process.

At S620, the controller 100 indicates the direction toward the travel road that has been actually traveled by the vehicle. Specifically, the controller 100 indicates the direction toward the location of the travel road with reference to the extension road connected to the guidance road. For example, suppose that the travel road is located on the left of the extension road. In this case, the user is notified that the travel road is located on the left of the extension road.

At S630, the controller 100 displays a frequently visited facility. Specifically, the controller 100 displays frequently visited facilities such as the user's residence and office using icons on the map. The process at S620 and S630 performed by the controller 100 functions as the notification portion 100e.

Figure 15A:
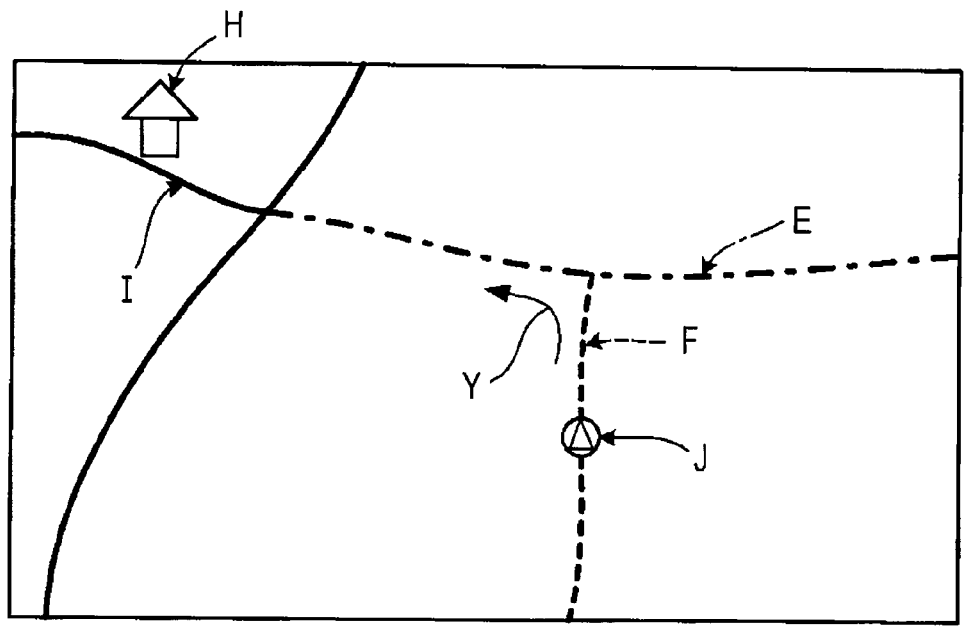
FIGS. 15A and 15B are explanatory diagrams specifically illustrating the direction indication process.
Figure 15B:
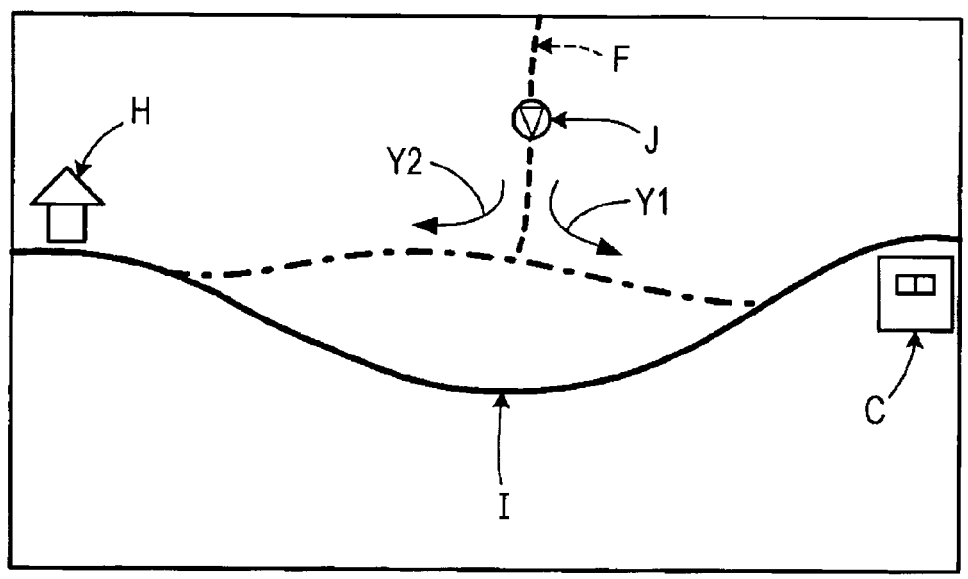

FIGS. 15A and 15B illustrate that vehicle J travels along guidance road F to extension road E. Suppose that no route guidance is performed in this case.

In FIG. 15A, the controller 100 determines that guidance road F is connected to extension road E (S600: YES in FIG. 14). The controller 100 determines whether the vehicle approaches to extension road E (S610). Upon determining that the vehicle approaches to extension road E (S610: YES), the controller 100 indicates the direction toward travel road I (S620). In FIG. 15A, for example, the controller 100 controls the display device 20 to indicate the direction toward travel road I using an arrow as an indication symbol Y. Obviously, the direction toward travel road I may be notified using audio guidance. The same applies to the following description. The controller 100 displays a frequently visited facility using an icon (S630). For example, as shown by symbol H in FIG. 15A, the user's residence that is frequently visited by the user is displayed using the icon.

FIG. 15B illustrates that travel road I extends from the residence represented by symbol H to the office represented by symbol C via an expressway. In FIG. 15B, the controller 100 determines that guidance road F is connected to extension road E (S600: YES in FIG. 14). Then, the controller 100 determines whether the vehicle approaches to extension road E (S610). Upon determining that the vehicle approaches to extension road E (S610: YES), the controller 100 indicates the direction toward travel road I (S620). In FIG. 15B, the travel road exists both to the left and to the right of the vehicle. Symbols Y1 and Y2 may represent the left and right directions to travel road I. The controller 100 displays a frequently visited facility using an icon (S630). In FIG. 15B, for example, symbol H is an icon that represents the residence of the user and symbol C is an icon that represents the office of the user.

The following describes advantages provided by the navigation device 1 according to the present embodiment.

As described above, the controller 100 according to the present embodiment includes the recognition road determination portion 100a, the recognition road specification portion 100b, and the switching portion 100c. According to the present embodiment, the external memory 19 functions as a "storage portion", and stores several recognition roads highly likely to be recognized by the user.

Based on the information stored in the external memory 19, the recognition road determination portion 100a of the controller 100 determines whether the road being traveled by the vehicle corresponds to the recognition road (S500 in FIG. 11). The recognition road determination portion 100a may determine that the road being traveled by the vehicle does not correspond to the recognition road (S500: NO). In this case, the recognition road specification portion 100b specifies a display-targeted recognition road to be displayed on the map (S520 and S530). When the recognition road specification portion 100b specifies the display-targeted recognition road, the switching portion 100c switches the map display so that the current location and at least part of the display-targeted recognition road are displayed in one display window (S550 and S570).

The navigation device 1 stores recognition roads highly likely to be recognized by the user. If the vehicle diverges from the recognition road, the navigation device 1 displays at least part of the display-targeted recognition road together with the current location in a single display window. Thus, the map displays the road highly likely to be recognized by the user together with the current location, and thereby, the user's psychological burden can be minimized.

According to the present embodiment, the navigation device 1 determines whether the route guidance is performed (S510 in FIG. 11). If the route guidance is being performed (S510: YES), the navigation device 1 determines whether the recognition road exists around the destination (S520). If the recognition road (first recognition road) exists around the destination (S520: YES), the navigation device 1 designates the recognition road as a display-targeted recognition road to be displayed on the map. That is, when the route guidance is performed and the recognition road exists around the destination, the recognition road specification portion 100b specifies the recognition road as the display-targeted recognition road to be displayed on the map.

The map display is switched when the vehicle travels from an unknown location to a known location (see FIG. 12B). The navigation device 1 controls the display device to display a recognition road highly likely to be recognized at an earlier stage of the return road from a leisure trip or from a first business trip, for example. With this configuration, the user's psychological burden can be reduced. The map display is not switched when the vehicle travels from a known location to an unknown location (see FIG. 12A).

According to the present embodiment, there may be a case where the vehicle diverges from the recognition road (S500: NO in FIG. 11) and no route guidance is performed (S510: NO). In such a case, the navigation device 1 retrieves the nearest recognition road (second recognition road) to be displayed on the map (S530). If no route guidance is performed, the recognition road specification portion 100b retrieves a recognition road closest to the current location and specifies the recognition road as a display-targeted recognition road to be displayed on the map. Namely, the navigation device 1 switches the map display so that the nearest recognition road is displayed on the display device if the vehicle slightly diverges from a known road (see FIG. 13A). With this configuration, the user's psychological burden can be reduced.

The navigation device 1 calculates the distance to be traveled by the vehicle to the recognition road along the traveling direction by multiplying the actual distance with the coefficient p (0<p<1). Thus, the calculated distance to the recognition road located in the vehicle's traveling direction is shorter than the actual distance. That is, the recognition road specification portion 100b adjusts the distance to the recognition road located in vehicle's traveling direction so that the calculated distance is shorter than the actual distance. Suppose that the user selects an inexperienced or unfamiliar road when the user returns to his or her residence from the office. In such a case, the navigation device 1 retrieves a recognition road in the vehicle's traveling direction as the nearest recognition road and switches the map display (see FIG. 13B). With this configuration, the user's psychological burden can be reduced.

According to the present embodiment, the vehicle may diverge from recognition roads R and R1 (S500: NO and S510: NO in FIG. 11). In such a case, the navigation device 1 retrieves the nearest recognition roads R and R2 (S530). The navigation device 1 switches the map display to include part of recognition roads R and R2 (S550) and displays guidance road F to recognition roads R and R2 (S550). In other words, the switching portion 100c switches the map display so as to include the current location, at least part of the recognition road, and the guidance road to the recognition road from the current location. With this configuration, the user's psychological burden can be further reduced.

According to the present embodiment, the navigation device 1 may determine that guidance road F is connected to extension road E (S600: YES in FIG. 14). In such a case, the navigation device 1 determines whether the vehicle approaches to extension road E (S610). Upon determining that the vehicle approaches to extension road E (S610: YES), the navigation device 1 indicates the direction toward travel road I (S620), which has been actually traveled by the vehicle. In FIGS. 15A and 15B, for example, symbols Y, Y1, and Y2 as arrows are used to indicate the directions toward travel road I. That is, the recognition road determination portion 100a may determine that the vehicle does not travel the recognition road. In such a case, the notification portion 100 indicates the direction toward the travel road when the vehicle approaches to the extension road included in the recognition road. With this configuration, the user's psychological burden can be reduced when the user travels from the guidance road to the extension road.

According to the present embodiment, the notification portion 100e displays a frequently visited facility using an icon (S630 in FIG. 14). In FIGS. 15A and 15B, for example, the notification portion 100e displays symbols H and C as residence and office icons, respectively. The notification portion 100e controls the display so that the displayed map includes a facility frequently visited in the past. With this configuration, the user's psychological burden can be further reduced.

According to the present embodiment, the navigation device 1 displays recognition roads R, R2, and guidance road F in different colors on the map display so that the user can easily recognize these roads. The switching portion 100c switches the map display so as to be able to distinguish the recognition road and a road related to the recognition road from other roads. With this configuration, the map display is easily understandable. Also from this viewpoint, the user's psychological burden can be further reduced.

According to the present embodiment, the controller 100 determines whether the recognition road is located within a predetermined distance from the current location of the vehicle (S540 in FIG. 11). Upon determining that the recognition road is located within a predetermined distance (S540: YES), the controller 100 switches the map display to include part of the recognition road (S550). In other words, the switching portion 100c of the controller 100 determines a switch timing to switch the map display according to the distance between the current location and the recognition road. The navigation device 1 can thereby switch the map display at a proper timing.

According to the present embodiment, the controller 100 determines whether the user issued a switchover instruction (S560 in FIG. 11). Upon determining that the user issued a switchover instruction (S560: YES), the controller 100 switches the map display to include part of the travel road (S570). In other words, the switching portion 100c of the controller 100 determines a switch timing to switch the map display according to a switchover instruction from the user. The navigation device 1 can thereby switch the map display at the timing requested by the user.

The user may issue a switchover instruction of zooming out to display a wider area of the map (S560: YES in FIG. 11) to switch the map display (S570). In other words, the switching portion 100c switches the map display so that a wider area is displayed on the map in response to a switchover instruction from the user. In this case, the map scale is switched at an irregular interval to include at least part of the travel road (display-targeted recognition road). Thus, the user can quickly acquire information about the travel road (display-targeted recognition road). With this configuration, the user's psychological burden can be reduced.

According to the present embodiment, the controller 100 automatically switches the map scale so as to include the current location and part of the recognition road, and adjusts the vehicle's display position (display area) to display the current location and part of the recognition road in a single display window (S550 and S570). In other words, the switching portion 100c of the controller 100 changes at least one of the map scale and the display area and thereby switches the map display to include the current location and at least part of the recognition road in a single display window. With this configuration, a switch of the map display can be easily performed.

Figure 2:
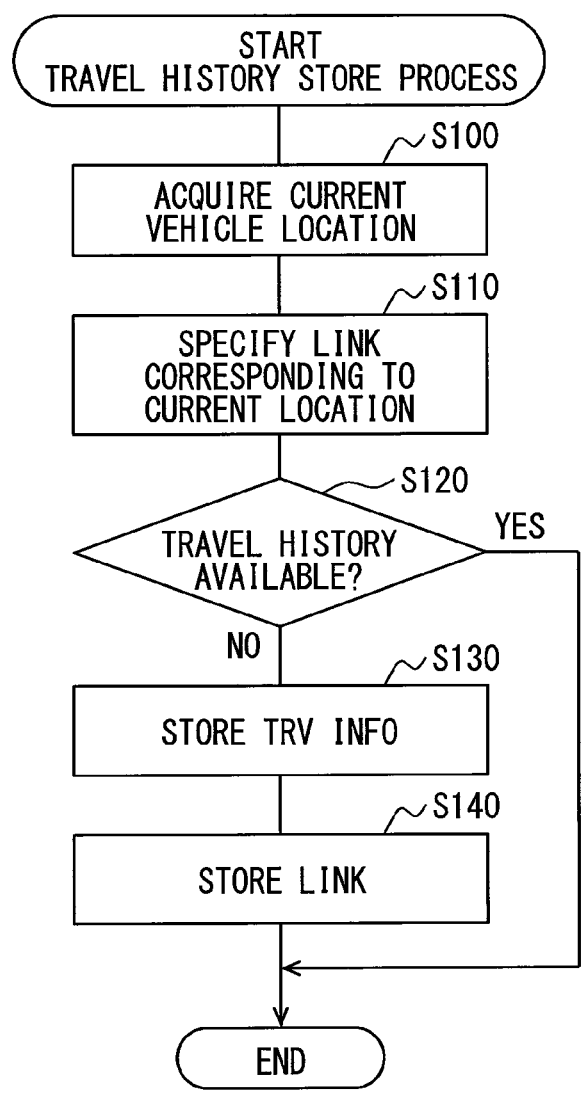
FIG. 2 is a flowchart illustrating a travel history storing process.

According to the present embodiment, the controller 100 specifies a travel road actually traveled by the vehicle and stores the travel road as the travel history information in the external memory 19 (see FIG. 2). In other words, the recognition road includes the travel road actually traveled by the vehicle. Accordingly, the recognition road is highly likely to be recognized by the user.

The controller 100 designates a road continuous with the travel road as an extension road (see FIG. 4). The controller 100 further includes a learning portion (LEARN) 100d that learns a road continuous with the travel road as an extension road (S250 in FIG. 4). That is, the recognition road includes the extension road of the travel road, which is learned by the learning portion. Accordingly, the recognition road is also highly likely to be recognized by the user.

Other Embodiments

It is to be distinctly understood that the present disclosure is not limited to the foregoing embodiments but may be otherwise variously embodied within the spirit and technical scope of the present disclosure.

(i) According to the foregoing embodiments, the travel history storing process illustrated in FIG. 2 specifies a link that corresponds to the current location acquired at S100 (S110). There may be provided a double linked road in which the lanes in one direction correspond to one link, and the lanes in opposite direction correspond to a different link. In such a case, the navigation device 1 may also specify a link corresponding to the opposite lanes in addition to a link corresponding to the current location. That is, when the travel road corresponds to one of the two links that are in opposite directions, the travel road specification portion 10a may also specify the other link as a travel road in addition to the link corresponding to the current location. With this configuration, the extension roads can be searched with respect to both the link corresponding to the current location and the link in the opposite direction.

(ii) The extension road designation process according to the foregoing embodiments determines whether the road names are equal to each other (S240 in FIG. 4 and S410 in FIG. 7). Concerning roads in Japan, as described above, the controller 10 determines an equivalence between the road type such as "national road" or "prefectural road" and the road number such as "1" or "10."

In other countries, roads are generally given road names. There may be a system of determining an equivalence between road names. Further, there may be a system of determining a partial equivalence between road names. The continuity determination portion 10b may determine the existence of continuity when the roads connected at an end point of the current link have names that are at least partially equal to the name of the current link. With this configuration, a flexible equivalence determination of the road names can be carried out.

For example, a "proper noun segment" may be used to determine the equivalence of the road names. Suppose that a road name includes the proper noun segment. The continuity determination portion 10b may determine the existence of continuity when the proper noun segment of one road name is equal to the proper noun segment of the other road name. By determining an equivalence of the proper noun segments, a flexible equivalence determination of the road names can be carried out.

In North America and Europe, for example, a road name is formed as [Prefix]+[Body]+[Street Type]+[Suffix]. In this case, the proper noun segment corresponds to [Body]. The continuity determination portion 10b may determine an equivalence between road names if the road names include the same [Body].

The road names may or may not be provided by [Prefix], [Street Type], and [Suffix].

For example, "W MAIN ROAD" is formed as [Prefix]+[Body]+[Street Type]. For another example, "5TH AVE SE" is formed as [Body]+[Street Type]+[Suffix]. For another example, "CA-10" is formed as only [Body].

The determination of an equivalence between character strings may be carried out in consideration of description fluctuation. In other words, the continuity determination portion 10b may determine an equivalence between road names in consideration of description fluctuation. As an example, "1st" and "First" are recognized as the same character string. As another example, "W" and "West" are recognized as the same character string. As another example, "ST" and "Street" are recognized as the same character string. With this configuration, to more flexible equivalence determination between road names can be carried out.

As actual examples, "W 5th St" and "E 5th St" use different [Prefix] and the same [Body].

As actual examples, road names of belt lines in China may include name segments representing directions and positions as the proper noun segment. For example, road name "North XX East Road" includes proper noun segment (first proper noun) "XX." Road name "North XX Center Road" includes proper noun segment (second proper noun) "XX." Road name "West XX South Road" includes proper noun segment (third proper noun) "XX."

(iii) According to the first embodiment, the controller 10 determines the necessity of guidance and, based on this, determines whether to establish an extension road (S220 in FIG. 4). The first embodiment designates a link smoothly formed along the road as a candidate for the extension road.

It may be favorable to terminate the extension road designation if a link intersects a higher-ranked road even if the link is smoothly formed along the road. The continuity determination portion 10b may determine the presence or absence of continuity according to the scale of a recognition road connected at the reference end point and the scale of a determination target road. In FIG. 5B, for example, links L5 and L8 are connected along the road. Suppose that a road indicated by links L9 and L10 is ranked higher than link L5. In this case, link L8 may not be designated as an extension road. What rank is given to the road may be determined according to at least one of the road type, the road width, and the number of lanes. With this configuration, the determination of continuity can be more properly carried out.

(iv) As illustrated in FIG. 3, in the foregoing embodiments, for distinguishment purpose, the travel history information of an actually traveled link is stored as "1" the travel history information of a link designated as the extension road is stored as "2". Alternatively, the travel history information of the link designated as the extension road can be set to "1".

Alternatively, an extension road may be provided with a coefficient correlated with a distance from the actually traveled link to distinguish different extension roads. The extension road designation portion 10c may distinguish different extension roads using coefficients correlated with distances from the travel road to each extension road. For example, the travel history information about extension roads may be stored as "3," "4," and "5" in ascending order corresponding to the ascending order of distances from the actually traveled link to the extension roads. This can change the guidance quantity corresponding to different extension roads.

In addition to the stepwise distinction between extension roads, it may be favorable to multiply a coefficient correlated with the distance to continuously change the guidance quantity for an extension road connected to the same link.

(v) In the travel history storing process illustrated in FIG. 2 according to the foregoing embodiments, the controller 10 may determine that the travel history is unavailable (S120: NO). In this case, the controller 10 stores the travel history information (S130) and stores the corresponding link (S140).

Figure 10:
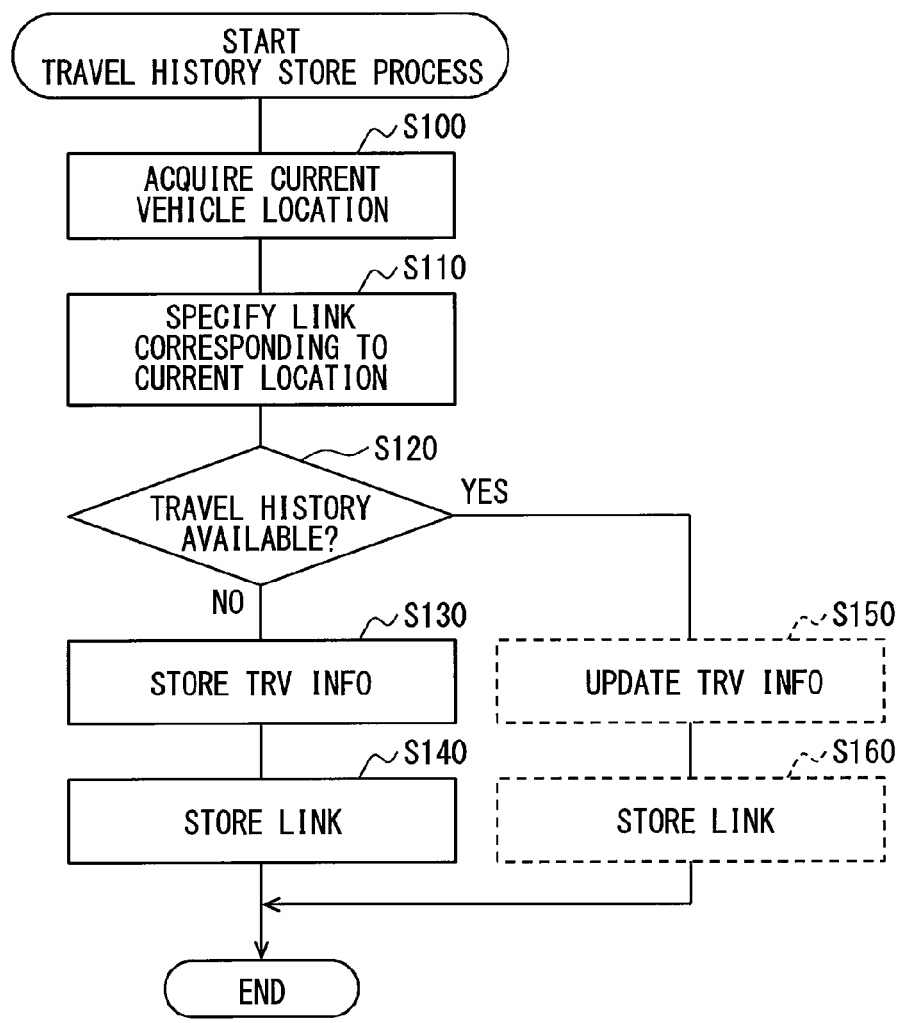
FIG. 10 is a flowchart illustrating the travel history storing process according to other embodiments of the present disclosure.

It may be favorable to use another technique indicated by broken lines in FIG. 10. If the travel history is available (S120: YES), the controller 10 may update the travel history information (S150) and store the updated link (S160). Updating the travel history information signifies updating the number of times by which the link actually has been traveled. In this case, an extension road may be established based on the number of travel times of the travel road. In other words, the travel road specification portion 10a specifies the travel road and specifies the number of travel times of the travel road. The extension road designation portion 10c may determine the number of travel times to designate extension roads based on the number of travel times of the travel road. In FIGS. 4 and 7, for example, the controller 10 may set the maximum number of times to establish extension roads (S250 and S450). In FIG. 7, for example, maximum connection count N may be set in consideration of the number of travel times (S310). As described in (iv), there may be provided a coefficient correlated with the number of travel times to distinguish different extension roads. The extension road designation portion 10c may distinguish different extension roads using the coefficient correlated with the number of travel times.

As described above, an appropriate extension road can be established by determining the presence or absence of continuity in consideration of the number of travels or by distinguishing different extension roads according to the coefficients correlated with the number of travel times.

(vi) According to the foregoing embodiments, the travel history information of an actually traveled road is set as "1" without exception.

Alternatively, the travel history information may be set and stored distinguishably depending on whether a retrieved guidance route includes the actually traveled road. In this case, the travel road specification portion 10a may specify a travel road and determine whether a retrieved guidance route includes the travel road. The extension road designation portion 10c may determine the number of times to designate extension roads based on whether a retrieved guidance route includes the travel road. Similarly to above-described (v), for example, in FIGS. 4 and 7, the controller 10 may set the maximum number of times to establish extension roads (S250 and S450) according to whether a retrieved guidance route includes the travel road. Further, in FIG. 7, maximum connection count N may be set in consideration of whether a retrieved guidance route includes the travel road (S310). The extension road designation portion 10c may establish an extension road to be distinguishable based on whether a retrieved guidance route includes the travel road. This configuration can change the guidance quantity depending on the extension roads.

(vii) According to the foregoing embodiments, road names (S240 in FIG. 4 and S410 in FIG. 7) are used to determine the existence of the continuity. Further, the continuity may be determined according to similarity among road standards, for example. Furthermore, the continuity may be determined according to whether the connected road orientation equals the travel road, namely, whether a turn right or turn left is unnecessary.

(viii) The foregoing embodiments determine the "distance" along the road as a spatial distance. Further, the distance may be expressed by a travel time acquired by dividing the distance by a speed limit for each road. For example, the travel time indicating the distance may be used for the process at S520, S530, and S540. With this configuration, the same advantages as the foregoing embodiments may also be provided.

(ix) According to the foregoing embodiments, at S540, the controller 100 determines whether the display-targeted recognition road is located within a predetermined distance. Further, the controller 100 may determine whether the number of types of roads disposed between the current location of the vehicle to the display-targeted recognition road is smaller than or equal to predetermined count S. Furthermore, the controller 100 may determine whether the number of times to turn right or left up to the display-targeted recognition road is smaller than or equal to predetermined count K. In other words, the switching portion 100c may determine the timing to switch the map display according to connection states of roads leading from the current location to the display-targeted recognition road. With this configuration, the same advantages as the foregoing embodiments may also be provided.

(x) According to the foregoing embodiments, the map display is automatically switched (S540: YES and S550: YES). In a case where a wider area needs to be displayed on the map display, a switchover instruction needs to be input by the user (S560). Further, the navigation device may further be configured to switch the map display according to the switchover instruction from the user instead of automatic display switch.

(xi) According to the foregoing embodiments, when indicating the travel road direction (S620 in FIG. 14), travel road I may exist on both sides of the vehicle as illustrated in FIG. 15B. The controller 100 may change the direction indication so that the direction is indicated based on a daily time period or date. For example, the user is highly likely to go to residence at night. Thus, the controller 100 may indicate the direction toward the residence represented by symbol H. The user is highly likely to go to the office in the morning or during the daytime. Thus, the controller 100 may indicate the direction toward the office represented by symbol C. If there are several directions corresponding to travel roads, the notification portion 100e may selectively indicate the directions based on the date information. For example, FIG. 15B illustrates first and second directions that differ from each other. The first direction corresponds to the position (left side) where the first part of the travel road (left part of the travel road with reference to the current location) exists. The second direction corresponds to the position (right side) where the second part of the travel road (right part of the travel road with reference to the current location) exists. The notification portion 100e may select one of the first and second directions based on the date information and notify the selected one. With this configuration, travel road directions can be indicated more appropriately.

(xii) When displaying the frequently visited facility as described in the foregoing embodiments (S630 in FIG. 14), the controller 100 may display an address or a city name in place of or in addition to the icon. In consideration of the map scale, addresses may be displayed on the right side and the left side in FIG. 15B for distinguishment purpose. The same applies to city names. In other words, the notification portion 100e may control the map display so that name information that indicates the direction toward a position where the travel road exists is displayed on the map. With this configuration, the direction toward a position where the travel road exists can be notified to the user in an easy-to-understand way. Also from this viewpoint, the user's psychological burden can be reduced.

(xiii) The present disclosure may also be provided as a navigation program product that includes computer-readable instructions to implement functions corresponding to the portions included in the navigation device described above. The navigation program product may be included in a non-transitory, tangible, and computer-readable storage medium.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

The invention claimed is:

1. A navigation device, which performs map display on a display device to display a current location of a vehicle on a map, retrieves a route to a destination and performs a route guidance to the destination, the navigation device comprising:
an external memory configured to store a plurality of recognition roads, wherein the recognition roads include (i) travel roads that are actually traveled by the vehicle and (ii) extension roads that are continuous with the travel roads but not actually traveled by the vehicle; and
a controller including a processor configured to
determine, based on information related to the recognition roads stored in the external memory, whether a road corresponding to the current location of the vehicle is included in the recognition roads;
specify a display-targeted recognition road when the road corresponding to the current location of the vehicle is determined to be not included in the recognition roads, the display-targeted recognition road being one of the recognition roads and to be displayed on the map on the display device; and
control the display device to switch, both in a route guidance activated state and in a route guidance deactivated state, the map display on the display device so that the current location of the vehicle and at least a part of the display-targeted recognition road are included in one display window when the display-targeted recognition road is specified.

2. The navigation device according to claim 1,
wherein the recognition roads include a first recognition road located close to the destination, and
wherein the processor is further configured to specify the first recognition road as the display-targeted recognition road in the route guidance activated state.

3. The navigation device according to claim 1,
wherein the recognition roads include a second recognition road located close to the current location of the vehicle, and
wherein the processor is further configured to retrieve the second recognition road, which is located closest to the current location of the vehicle among the recognition roads, and specify the second recognition road as the display-targeted recognition road when the route guidance is not performed.

4. The navigation device according to claim 3,
wherein the second recognition road is located ahead of the vehicle along a traveling direction of the vehicle, and
wherein the processor is further configured to, when the processor retrieves, from the recognition roads, the second recognition road that is located closest to the current location of the vehicle, adjust a display distance from the current location of the vehicle to the second recognition road to be shorter than an actual distance.

5. The navigation device according to claim 1,
wherein the processor is further configured to switch the map display so that the map includes the current location of the vehicle, the at least a part of the display-targeted recognition road, and a guidance road from the current location of the vehicle to the display-targeted recognition road.

6. The navigation device according to claim 1, wherein the processor is further configured to:
indicated a direction toward a location where one of the travel roads is located when the vehicle approaches to one of the extension roads connected with the one of the travel roads in a case where the road corresponding to the current location of the vehicle is determined to be not included in the recognition roads stored in the external memory.

7. The navigation device according to claim 6,
wherein the processor is further configured to control the map display so that the map includes a facility that is frequently visited in the past.

8. The navigation device according to claim 6,
wherein the processor is further configured to control the map display so that the map includes name information indicating the direction toward the location where the one of the travel roads is located.

9. The navigation device according to claim 6,
wherein the one of the travel roads includes a first part, and a direction indicating the first part of the one of the travel roads corresponds to a first direction,
wherein the one of the travel roads includes a second part, and a direction indicating the second part of the one of the travel roads corresponds to a second direction, and
wherein, when the first direction differs from the second direction, the processor is further configured to notify one of the first direction and the second direction based on date information.

10. The navigation device according to claim 1,
wherein, when the processor switches the map display, the processor is further configured to display the recognition roads and roads related to the recognition roads as distinguishable from other roads.

11. The navigation device according to claim 1,
wherein, when a distance from the current location of the vehicle to the display-targeted recognition road is shorter than a predetermined distance, the processor is further configured to switch the map display so that the one display window includes the current location of the vehicle and the at least a part of the display-targeted recognition road.

12. The navigation device according to claim 1, wherein the processor is further configured to determine a switching timing of the map display according to a connection state of a guidance road from the current location of the vehicle to the display-targeted recognition road.

13. The navigation device according to claim 1, wherein the processor is further configured to determine a switching timing of the map display based on a switchover instruction input by a user.

14. The navigation device according to claim 13,
wherein the processor is further configured to switch the map display so that a map of a wider area is displayed in response to the switchover instruction input by the user.

15. The navigation device according to claim 1,
wherein, when switching the map display, the processor is further configured to switch at least one of a map scale or a display area of the map so that the one display window includes the current location of the vehicle and the at least a part of the display-targeted recognition road.

16. A navigation program product, which is stored in a non-transitory tangible computer readable storage medium, comprising instructions to be executed by a computer, the instructions when executed by the computer cause the computer to:
store, in an external memory, a plurality of recognition roads, wherein the recognition roads include (i) travel roads that are actually traveled by the vehicle and (ii) extension roads that are continuous with the travel roads but not actually travel by the vehicle; and
determine, based on information related to the recognition roads stored in the external memory, whether a road corresponding to the current location of the vehicle is included in the recognition roads;
specify a display-targeted recognition road when the road corresponding to the current location of the vehicle is determined to be not included in the recognition roads, the display-targeted recognition road being one of the recognition roads and to the displayed on the map on a display device; and
control the display device to switch, both in a route guidance activated state and in a route guidance deactivated state, the map display on the display device so that the current location of the vehicle and at least a part of the display-targeted recognition are included in one display window when the display-targeted recognition road is specified.

17. A navigation device, which performs map display on a display device to display a current location of a vehicle on a map, retrieves a route to a destination and performs a route guidance to the destination, the navigation device comprising:
an external memory configured to store a plurality of recognition roads, wherein the recognition roads include (i) travel roads that are actually traveled by the vehicle and (ii) extension roads that are continuous with the travel road but are not actually traveled by the vehicle;
a controller including a processor configured to
determine, based on information related to the recognition roads stored in the external memory, whether a road corresponding to the current location of the vehicle is included in the recognition roads; and
control display device to indicate, both in a route guidance activated state and in a route guidance deactivated state, a direction toward a location where one of the travel roads is located when the vehicle approaches to one of the extension roads connected with the one of the travel roads in a case where the road corresponding to the current location of the vehicle is determined to be not included in the recognition roads stored in the external memory.

18. The navigation device according to claim 17, wherein the processor is further configured to control the map display so that the map includes a facility that is frequently visited in the past.

19. The navigation device according to claim 17, wherein the processor is further configured to control the map display so that the map includes name information indicating the direction toward the location where the one of the travel roads is located.

20. The navigation device according to claim 17, wherein the one of the travel roads includes a first part, and a direction indicating the first part of the one of the travel roads corresponds to a first direction,
wherein the one of the travel roads includes a second part, and a direction indicating the second part of the one of the travel roads corresponds to a second direction, and
wherein, when the first direction differs from the second direction, the processor is further configured to notify one of the first direction and the second direction based on date information.

21. A navigation program product, which is stored in a non-transitory tangible computer readable storage medium, comprising instructions to be executed by a computer, the instructions when executed by the computer cause the computer to:
- store, in an external memory, a plurality of recognition roads, wherein the recognition roads include (i) travel roads that are actually traveled by the vehicle and (ii) extension roads that are continuous with the travel road but are not actually traveled by the vehicle;
- determine, based on information related to the recognition roads stored in the external memory, whether a road corresponding to the current location of the vehicle is included in the recognition roads; and
- control a display device to indicate, both in a route guidance activated state and in a route guidance deactivated state, a direction toward a location where one of the travel roads is located when the vehicle approaches to the one of the extension roads connected with the one of the travel roads in case where the road corresponding to the current location of the vehicle is determined to be not included in the recognition roads stored in the external memory.

\* \* \* \* \*